(12) United States Patent
Wang et al.

(10) Patent No.: US 10,750,511 B2
(45) Date of Patent: Aug. 18, 2020

(54) BEAM IDENTIFIER OBTAINING METHOD AND APPARATUS, DEVICE, AND SYSTEM

(71) Applicant: Huawei Technologies Co., Ltd., Senzhen, Guangdong (CN)

(72) Inventors: Ting Wang, Shanghai (CN); Yuanjie Li, Shanghai (CN); Jian Zhang, Shanghai (CN); Yongxing Zhou, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/716,851

(22) Filed: Sep. 27, 2017

(65) Prior Publication Data
US 2018/0063828 A1 Mar. 1, 2018

Related U.S. Application Data

(63) Continuation of application No. PCT/CN2015/075249, filed on Mar. 27, 2015.

(51) Int. Cl.
*H04W 4/00* (2018.01)
*H04W 72/04* (2009.01)
(Continued)

(52) U.S. Cl.
CPC ........ *H04W 72/048* (2013.01); *H04B 7/0456* (2013.01); *H04B 7/063* (2013.01);
(Continued)

(58) Field of Classification Search
CPC ............ H04W 72/0453; H04W 72/044; H04L 5/00077; H04L 5/0053; H04L 5/0048
See application file for complete search history.

(56) References Cited

U.S. PATENT DOCUMENTS 6,714,780 B1 3/2004 Antonio et al.
2010/0118839 A1* 5/2010 Malladi ................ H04L 27/261
370/336
(Continued)

FOREIGN PATENT DOCUMENTS

CN 1881829 A 12/2006
CN 101674273 A 3/2010
(Continued)

OTHER PUBLICATIONS

"ETSI; LTE; Evolved Universal Terrestrial Radio Access (E-UTRA); Physical channels and modulation (3GPP TS 36.211 version 12.4.0 Release 12)"; ETSI TS 136 211 V12.4.0; Feb. 2015; 126 pages.
(Continued)

*Primary Examiner* — Atique Ahmed
(74) *Attorney, Agent, or Firm* — Conley Rose, P.C.

(57) ABSTRACT

Embodiments of the present disclosure provide a beam identifier obtaining method and apparatus, a device, and a system. The method includes: determining, by a base station, a signal corresponding to a beam identifier; sending, by the base station, the signal by using a beam corresponding to the beam identifier, so that user equipment detecting the signal obtains the beam identifier according to the signal; and when receiving the beam identifier fed back by the user equipment, communicating, by the base station, with the user equipment by using the beam corresponding to the beam identifier.

20 Claims, 10 Drawing Sheets

(51) Int. Cl.
*H04B 7/06* (2006.01)
*H04B 7/0456* (2017.01)
*H04L 5/00* (2006.01)
*H04W 16/28* (2009.01)
*H04B 7/0417* (2017.01)
*H04B 7/0452* (2017.01)

(52) U.S. Cl.
CPC ......... *H04B 7/0695* (2013.01); *H04L 5/0023* (2013.01); *H04W 16/28* (2013.01); *H04W 72/046* (2013.01); *H04W 72/0413* (2013.01); *H04B 7/0417* (2013.01); *H04B 7/0452* (2013.01)

(56) References Cited

U.S. PATENT DOCUMENTS

| | | | |
|---|---|---|---|
| 2010/0272077 A1* | 10/2010 | van Rensburg | H04W 72/1231 370/336 |
| 2013/0094468 A1* | 4/2013 | Ko | H04B 7/0404 370/329 |
| 2013/0156125 A1* | 6/2013 | Ko | H04B 7/0478 375/267 |
| 2013/0235742 A1* | 9/2013 | Josiam | H04W 24/10 370/252 |
| 2013/0322376 A1* | 12/2013 | Marinier | H04B 17/24 370/329 |
| 2014/0098689 A1* | 4/2014 | Lee | H04B 7/0639 370/252 |
| 2014/0192768 A1* | 7/2014 | Yeh | H04B 7/0469 370/330 |
| 2014/0254539 A1* | 9/2014 | Nagata | H04L 5/0051 370/329 |
| 2014/0334566 A1* | 11/2014 | Kim | H04B 7/0469 375/267 |
| 2014/0341048 A1* | 11/2014 | Sajadieh | H04L 25/03305 370/252 |
| 2015/0341091 A1* | 11/2015 | Park | H04B 7/0456 375/267 |
| 2016/0043781 A1* | 2/2016 | Cho | H04L 5/0051 342/373 |
| 2016/0197659 A1 | 7/2016 | Yu et al. | |
| 2016/0204921 A1* | 7/2016 | Kim | H04L 12/189 370/312 |
| 2016/0337916 A1* | 11/2016 | Deenoo | H04W 36/0094 |
| 2016/0373180 A1 | 12/2016 | Guo et al. | |
| 2017/0033851 A1 | 2/2017 | Zhong et al. | |

FOREIGN PATENT DOCUMENTS

| | | |
|---|---|---|
| CN | 103716081 A | 4/2014 |
| CN | 103812546 A | 5/2014 |
| WO | 2014071852 A1 | 5/2014 |
| WO | 2014116090 A1 | 7/2014 |
| WO | 2014187322 A1 | 11/2014 |
| WO | 2014208844 A1 | 12/2014 |
| WO | 2015020404 A1 | 2/2015 |

OTHER PUBLICATIONS

Machine Translation and Abstract of International Publication No. WO2014071852A1, May 15, 2014, 34 pages.

Foreign Communication From a Counterpart Application, European Application No. 15886796.0, European Office Action dated Sep. 9, 2019, 7 pages.

* cited by examiner

BEAM IDENTIFIER OBTAINING METHOD AND APPARATUS, DEVICE, AND SYSTEM

CROSS-REFERENCE TO RELATED APPLICATIONS

This application is a continuation of International Application No. PCT/CN2015/075249, filed on Mar. 27, 2015, the disclosure of which is hereby incorporated by reference in its entirety.

TECHNICAL FIELD

The present application relates to the field of communications technologies, and in particular, to a beam identifier obtaining method and apparatus, a device, and a system.

BACKGROUND

A beam is a shape that an electromagnetic wave transmitted by using an antenna forms on a surface of the earth. A beam width is determined by an antenna gain. A larger antenna gain indicates a smaller beam width, that is, a narrower beam.

In a propagation process, a signal sent by using an antenna of a base station is easily absorbed and scattered by an obstruction such as rain, fog, or a building. Consequently, a path loss is relatively large. To compensate for the path loss in the propagation process, the base station may send a signal by using multiple antennas and a massive MIMO (multiple input multiple output) technology, so as to generate an extremely large antenna gain.

A beam formed when the base station generates an extremely large antenna gain is extremely narrow, causing a small coverage area of a single beam. To increase a signal coverage area, the base station needs to send a signal by using multiple beams. Even a synchronization signal, a broadcast signal, a control signal, or the like needs to be sent by using a beam. Therefore, user equipment needs to determine a beam in which the user equipment is currently located, so as to better communicate with the base station. However, for any user equipment within the signal coverage area, even though the user equipment detects the signal sent by the base station, the user equipment cannot determine which beam the user equipment is currently located in. Consequently, the user equipment cannot notify the base station of the beam in which the user equipment is located, and the base station cannot further communicate with the user equipment. Therefore, how to determine, according to the signal sent by the base station, the beam in which the user equipment is currently located becomes a problem to be resolved.

SUMMARY

To determine a beam in which user equipment is currently located, embodiments of the present disclosure provide a beam identifier obtaining method and apparatus, a device, and a system. The technical solutions are as follows:

According to a first aspect, a beam identifier obtaining method is provided, and the method includes:

determining, by a base station, a signal corresponding to a beam identifier;

sending, by the base station, the signal by using a beam corresponding to the beam identifier, so that user equipment detecting the signal obtains the beam identifier according to the signal; and when receiving the beam identifier fed back by the user equipment, communicating, by the base station, with the user equipment by using the beam corresponding to the beam identifier.

With reference to the first aspect, in a first possible implementation of the first aspect, the determining, by a base station, a signal corresponding to a beam identifier includes:

scrambling, by the base station, a first signal according to the beam identifier, so as to obtain a second signal.

With reference to the first possible implementation of the first aspect, in a second possible implementation of the first aspect, the scrambling, by the base station, a first signal according to the beam identifier, so as to obtain a second signal includes:

when the first signal is a secondary synchronization signal, generating, by the base station, a scrambling sequence according to the beam identifier, or generating, by the base station, a scrambling sequence according to the beam identifier and a total beam quantity; and scrambling, by the base station, the first signal according to the generated scrambling sequence, so as to obtain the second signal.

With reference to the second possible implementation of the first aspect, in a third possible implementation of the first aspect, the generating, by the base station, a scrambling sequence according to the beam identifier includes:

generating, by the base station, the scrambling sequence according to the beam identifier by using the following formula:

$$b_0(n) = \tilde{b}((n + N_{beam}^{ID}) \bmod 31), \text{ where}$$

$b_0(n)$ represents the scrambling sequence, $N_{beam}^{ID}$ represents the beam identifier, $\tilde{b}(i) = 1 - 2x_1(i)$, $0 \leq i \leq 30$, $x_1(\bar{i}+5) = (a \cdot x_1(\bar{i}+4) + b \cdot x_1(\bar{i}+3) + c \cdot x_1(\bar{i}+2) + d \cdot x_1(\bar{i}+1) + e \cdot x_1(\bar{i})) \bmod 2$, $0 \leq \bar{i} \leq 25$, and a value of each of a, b, c, d, and e is 0 or 1.

With reference to the second possible implementation of the first aspect, in a fourth possible implementation of the first aspect, the scrambling, by the base station, the first signal according to the generated scrambling sequence, so as to obtain the second signal includes:

scrambling, by the base station, the first signal according to the generated scrambling sequence by using the following formulas, so as to obtain the second signal:

$$d(2n) = \begin{cases} s_0^{(m_0)}(n)c_0(n)b_0(n) & \text{in a subframe } m \\ s_1^{(m_1)}(n)c_0(n)b_0(n) & \text{in a subframe } n \end{cases}$$

$$d(2n+1) = \begin{cases} s_1^{(m_1)}(n)c_1(n)b_0(n)z_1^{(m_0)}(n) & \text{in a subframe } m \\ s_0^{(m_0)}(n)c_1(n)b_0(n)z_1^{(m_1)}(n) & \text{in a subframe } n \end{cases},$$

where $b_0(n)$ represents the scrambling sequence, $0 \leq n \leq 30$, $d(2n)$ and $d(2n+1)$ represent sequences of the second signal, and the subframe m and the subframe n represent subframes in which the secondary synchronization signal is located;

$$s_0^{(m_0)}(n) = \tilde{s}((n+m_0) \bmod 31)$$

$$s_1^{(m_1)}(n) = \tilde{s}((n+m_1) \bmod 31),$$

$\tilde{s}(j)=1-2x_2(j)$, $x_2(\bar{j}+5)=(x_2(\bar{j}+2)+x_2(\bar{j}))\bmod 2$, $0 \le \bar{j} \le 30$, $0 \le \bar{j} \le 25$, and $x_2(0)=0$, $x_2(1)=0$, $x_2(2)=0$, $x_2(3)=0$, and $x_2(4)=1$;

$c_0(n)=\tilde{c}((n+N_{ID}^{(2)})\bmod 31)$ $c_1(n)=\tilde{c}((n+N_{ID}^{(2)}+3)\bmod 31)$, $N_{ID}^{(2)}$ represents a cell identity, $N_{ID}^{(2)} \in \{0,1,2\}$, $\tilde{c}(k)=1-2x_3(k)$, $0 \le k \le 30$, $x_3(\bar{k}+5)=(x_3(\bar{k}+3)+x_3(\bar{k}))\bmod 2$, $0 \le \bar{k} \le 25$, and $x_3(0)=0$, $x_3(1)=0$, $x_3(2)=0$, $x_3(3)=0$, and $x_3(4)=1$; and $z_0^{(m_0)}(n)=\tilde{z}((n+(m_0 \bmod 8))\bmod 31)$ $z_1^{(m_1)}(n)=\tilde{z}((n+(m_1 \bmod 8))\bmod 31)$, $\tilde{z}(r)=1-2x_4(r)$, $0 \le r \le 30$, $x_4(\bar{r}+5)=(x_4(\bar{r}+4)+x_4(\bar{r}+2)+x_4(\bar{r}+1)+x_4(\bar{r}))\bmod 2$, $0 \le \bar{r} \le 25$, and $x_4(0)=0$, $x_4(1)=0$, $x_4(2)=0$, $x_4(3)=0$, and $x_4(4)=1$.

With reference to the second possible implementation of the first aspect, in a fifth possible implementation of the first aspect, the generating, by the base station, a scrambling sequence according to the beam identifier and a total beam quantity includes:

generating, by the base station, scrambling sequences according to the beam identifier and the total beam quantity by using the following formulas:

$b_0(n)=\tilde{b}((n+N_{beam}^{ID})\bmod 31)$ $b_1(n)=\tilde{b}((n+N_{beam}^{ID}+N_{sumbeam})\bmod 31)$, where $b_0(n)$ and $b_1(n)$ represent the scrambling sequences, $N_{beam}^{ID}$ represents the beam identifier, $N_{sumbeam}$ represents the total beam quantity, $N_{beam}^{ID}=0,1,\ldots,N_{sumbeam}-1$, $\tilde{b}(i)=1-2x_1(i)$, and $0 \le i \le 30$; and $x_1(\bar{i}+5)=(a \cdot x_1(\bar{i}+4)+b \cdot x_1(\bar{i}+3)+c \cdot x_1(\bar{i}+2)+d \cdot x_1(\bar{i}+1)+e \cdot x_1(\bar{i}))\bmod 2$, $0 \le \bar{i} \le 25$, and a value of each of a, b, c, d, and e is 0 or 1.

With reference to the second possible implementation of the first aspect, in a sixth possible implementation of the first aspect, the scrambling, by the base station, the first signal according to the generated scrambling sequence, so as to obtain the second signal includes:

scrambling, by the base station, the first signal according to the generated scrambling sequence by using the following formulas, so as to obtain the second signal:

$$d(2n) = \begin{cases} s_0^{(m_0)}(n)c_0(n)b_0(n) & \text{in a subframe } m \\ s_1^{(m_1)}(n)c_0(n)b_0(n) & \text{in a subframe } n \end{cases}$$

$$d(2n+1) = \begin{cases} s_1^{(m_1)}(n)c_1(n)b_1(n)z_1^{(m_0)}(n) & \text{in a subframe } m \\ s_0^{(m_0)}(n)c_1(n)b_1(n)z_1^{(m_1)}(n) & \text{in a subframe } n \end{cases},$$

where $b_0(n)$ and $b_1(n)$ represent the scrambling sequences, $0 \le n \le 30$, $d(2n)$ and $d(2n+1)$ represent sequences of the second signal, and the subframe m and the subframe n represent subframes in which the secondary synchronization signal is located;

$s_0^{(m_0)}(n)=\tilde{s}((n+m_0)\bmod 31)$ $s_1^{(m_1)}(n)=\tilde{s}((n+m_1)\bmod 31)$, $\tilde{s}(j)=1-2x_2(j)$, $x_2(\bar{j}+5)=(x_2(\bar{j}+2)+x_2(\bar{j}))\bmod 2$, $0 \le \bar{j} \le 30$, $0 \le \bar{j} \le 25$, and $x_2(0)=0$, $x_2(1)=0$, $x_2(2)=0$, $x_2(3)=0$, and $x_2(4)=1$;

$c_0(n)=\tilde{c}((n+N_{ID}^{(2)})\bmod 31)$ $c_1(n)=\tilde{c}((n+N_{ID}^{(2)}+3)\bmod 31)$, $N_{ID}^{(2)}$ represents a cell identity, $N_{ID}^{(2)} \in \{0,1,2\}$, $\tilde{c}(k)=1-2x_3(k)$, $0 \le k \le 30$, $x_3(\bar{k}+5)=(x_3(\bar{k}+3)+x_3(\bar{k}))\bmod 2$, $0 \le \bar{k} \le 25$, and $x_3(0)=0$, $x_3(1)=0$, $x_3(2)=0$, $x_3(3)=0$, and $x_3(4)=1$; and $z_0^{(m_0)}(n)=\tilde{z}((n+(m_0 \bmod 8))\bmod 31)$ $z_1^{(m_1)}(n)=\tilde{z}((n+(m_1 \bmod 8))\bmod 31)$, $\tilde{z}(r)=1-2x_4(r)$, $0 \le r \le 30$, $x_4(\bar{r}+5)=(x_4(\bar{r}+4)+x_4(\bar{r}+2)+x_4(\bar{r}+1)+x_4(\bar{r}))\bmod 2$, $0 \le \bar{r} \le 25$, and $x_4(0)=0$, $x_4(1)=0$, $x_4(2)=0$, $x_4(3)=0$, and $x_4(4)=1$.

With reference to the first aspect, in a seventh possible implementation of the first aspect, the determining, by a base station, a signal corresponding to a beam identifier includes:

calculating, by the base station, an initialization value according to the beam identifier, or calculating an initialization value according to the beam identifier and a cell identity; and generating a reference signal according to the calculated initialization value.

With reference to the seventh possible implementation of the first aspect, in an eighth possible implementation of the first aspect, the reference signal is a cell-specific reference signal CRS or a channel state information-reference signal CSI-RS.

With reference to the seventh possible implementation of the first aspect, in a ninth possible implementation of the first aspect, the calculating, by the base station, an initialization value according to the beam identifier includes:

calculating, by the base station, the initialization value according to the beam identifier by using the following formula:

$c_{init}=2^{10} \cdot (7 \cdot (n_s+1)+l+1) \cdot (2 \cdot N_{beam}^{ID}+1)+2 \cdot N_{beam}^{ID}+N_{CP}$, where $c_{init}$ represents the initialization value, $n_s$ represents a timeslot number, $l$ represents an orthogonal frequency division multiplexing OFDM symbol number, $N_{beam}^{ID}$ represents the beam identifier, and $N_{CP}$ represents a cyclic prefix CP length identifier.

With reference to the seventh possible implementation of the first aspect, in a tenth possible implementation of the first aspect, the calculating, by the base station, an initialization value according to the beam identifier and a cell identity includes:

generating, by the base station, a specified identifier according to the beam identifier and the cell identity; and calculating, by the base station, the initialization value according to the specified identifier by using the following formula:

$c_{init}=2^{10} \cdot (7 \cdot (n_s+1)+l+1) \cdot (2 \cdot N_{ID}^{new}+1)+2 \cdot N_{ID}^{new}+N_{CP}$, where $c_{init}$ represents the initialization value, $n_s$ represents a timeslot number, $l$ represents an orthogonal frequency division multiplexing OFDM symbol number, $N_{ID}^{new}$ represents the specified identifier, and $N_{CP}$ represents a cyclic prefix CP length identifier.

With reference to the first aspect, in an eleventh possible implementation of the first aspect, the determining, by a base station, a signal corresponding to a beam identifier includes:

generating, by the base station, a beam signal corresponding to the beam identifier, where the beam signal includes the beam identifier; and correspondingly, the method further includes:

determining, by the base station, a time-frequency resource location of the beam signal; and sending, by the base station, the beam signal at the time-frequency resource location of the beam signal by using the beam corresponding to the beam identifier, so that user equipment detecting the beam signal obtains the beam identifier included in the beam signal.

With reference to the eleventh possible implementation of the first aspect, in a twelfth possible implementation of the first aspect, there is a preset spacing between a time-frequency resource location of a third signal and the time-frequency resource location that is of the beam signal and that is determined by the base station.

With reference to the eleventh possible implementation of the first aspect, in a thirteenth possible implementation of the first aspect, the method further includes:

determining, by the base station, the time-frequency resource location of the beam signal as a preset time-frequency resource location; and sending, by the base station, the beam signal at the preset time-frequency resource location by using the beam corresponding to the beam identifier, so that the user equipment detects the beam signal at the preset time-frequency resource location, and obtains the beam identifier included in the beam signal.

With reference to the eleventh possible implementation of the first aspect, in a fourteenth possible implementation of the first aspect, the method further includes:

sending, by the base station, time-frequency resource information to the user equipment, where the time-frequency resource information includes a time-frequency resource location identifier of the beam signal, so that the user equipment detects the beam signal at the time-frequency resource location according to the time-frequency resource location identifier.

With reference to the first aspect, in a fifteenth possible implementation of the first aspect, the determining, by abase station, a signal corresponding to a beam identifier includes:

determining, by the base station according to a preset correspondence between a time-frequency resource location identifier and a beam identifier, a time-frequency resource location identifier corresponding to the beam identifier; and configuring, by the base station to the signal, a time-frequency resource indicated by the time-frequency resource location identifier, so that when the signal is sent by using the beam corresponding to the beam identifier, the user equipment detecting the signal obtains the beam identifier according to the time-frequency resource location identifier of the signal and the correspondence.

With reference to the fifteenth possible implementation of the first aspect, in a sixteenth possible implementation of the first aspect, in the correspondence, a beam identifier corresponding to each time-frequency resource location identifier is obtained by performing modulo operation on the corresponding time-frequency resource location identifier and a total beam quantity; and correspondingly, the base station configures, to the signal, the time-frequency resource indicated by the time-frequency resource location identifier, so that the user equipment detecting the signal performs modulo operation on the time-frequency resource location identifier of the signal and the total beam quantity, so as to obtain the beam identifier.

With reference to the first aspect, in a seventeenth possible implementation of the first aspect, the communicating, by the base station, with the user equipment by using the beam corresponding to the beam identifier includes:

if the base station receives multiple beam identifiers fed back by the user equipment, obtaining signal strength corresponding to each beam identifier;

selecting, by the base station, one beam identifier from the multiple beam identifiers according to the signal strength corresponding to the multiple beam identifiers; and communicating, by the base station, with the user equipment by using a beam corresponding to the selected beam identifier.

According to a second aspect, a beam identifier obtaining method is provided, and the method includes:

detecting, by user equipment, a signal sent by a base station by using a beam, where the signal is corresponding to a beam identifier of the beam;

obtaining, by the user equipment, the beam identifier according to the signal; and sending, by the user equipment, the beam identifier to the base station, so that the base station communicates with the user equipment by using the beam corresponding to the beam identifier.

With reference to the second aspect, in a first possible implementation of the second aspect, the obtaining, by the user equipment, the beam identifier according to the signal includes:

descrambling, by the user equipment, the signal to obtain a scrambling sequence of the signal, and obtaining the beam identifier according to the scrambling sequence, where the signal is obtained by the base station by performing scrambling according to the beam identifier; or parsing, by the user equipment, the signal to obtain an initialization value of the signal, and obtaining the beam identifier according to the initialization value, where the initialization value is calculated by the base station according to the beam identifier; or determining, by the user equipment according to a preset correspondence between a time-frequency resource location identifier and a beam identifier, a beam identifier corresponding to a time-frequency resource location identifier of the signal, where a time-frequency resource location of the signal is determined according to the beam identifier and the correspondence; or obtaining, by the user equipment, a time-frequency resource location identifier of the signal, and performing modulo operation on the time-frequency resource location identifier and a total beam quantity, so as to obtain the beam identifier.

With reference to the second aspect, in a second possible implementation of the second aspect, the detecting, by user equipment, a signal sent by a base station by using a beam includes:

detecting, by the user equipment, a beam signal sent by the base station by using the beam, where the beam signal includes the beam identifier.

With reference to the second possible implementation of the second aspect, in a third possible implementation of the second aspect, the detecting, by the user equipment, a beam signal sent by the base station by using the beam includes:

detecting, by the user equipment, the beam signal at a location between which and a time-frequency resource location of a third signal there is a preset spacing, where there is the preset spacing between a time-frequency resource location of the beam signal and the time-frequency resource location of the third signal.

With reference to the second possible implementation of the second aspect, in a fourth possible implementation of the second aspect, the detecting, by the user equipment, a beam signal sent by the base station by using the beam includes:

detecting, by the user equipment, the beam signal at a preset time-frequency resource location.

With reference to the second possible implementation of the second aspect, in a fifth possible implementation of the second aspect, before the detecting, by the user equipment, a beam signal sent by the base station by using the beam, the method further includes:

receiving, by the user equipment, time-frequency resource information sent by the base station, where the time-frequency resource information includes a time-frequency resource location identifier of the beam signal; and detecting, by the user equipment, the beam signal at the time-frequency resource location according to the time-frequency resource location identifier.

With reference to the second aspect, in a sixth possible implementation of the second aspect, the method further includes:

when detecting multiple signals sent by the base station, obtaining, by the user equipment, signal strength of each signal in the multiple signals; and sending, by the user equipment, the signal strength of each signal and a corresponding beam identifier to the base station, so that the base station selects one beam identifier from multiple received beam identifiers according to signal strength corresponding to the multiple beam identifiers, and communicates with the user equipment by using a beam corresponding to the selected beam identifier; or successively sending, by the user equipment to the base station in descending order of the signal strength of all the signals, a beam identifier corresponding to each signal, so that the base station selects one beam identifier from the multiple beam identifiers according to a receiving order of all the beam identifiers, and communicates with the user equipment by using a beam corresponding to the selected beam identifier; or selecting, by the user equipment, one beam identifier according to signal strength of a signal corresponding to each beam identifier, and sending the selected beam identifier to the base station, so that the base station communicates with the user equipment by using a beam corresponding to the beam identifier.

According to a third aspect, a beam identifier obtaining apparatus is provided, and the apparatus includes:

a processing module, configured to determine a signal corresponding to a beam identifier;

a sending module, configured to send the signal by using a beam corresponding to the beam identifier, so that user equipment detecting the signal obtains the beam identifier according to the signal; and a receiving module, configured to receive the beam identifier fed back by the user equipment, where the processing module is further configured to communicate with the user equipment by using the beam corresponding to the beam identifier.

With reference to the third aspect, in a first possible implementation of the third aspect, the processing module is further configured to scramble a first signal according to the beam identifier, so as to obtain a second signal.

With reference to the first possible implementation of the third aspect, in a second possible implementation of the third aspect, the processing module is further configured to: when the first signal is a secondary synchronization signal, generate a scrambling sequence according to the beam identifier, or generate a scrambling sequence according to the beam identifier and a total beam quantity; and scramble the first signal according to the generated scrambling sequence, so as to obtain the second signal.

With reference to the second possible implementation of the third aspect, in a third possible implementation of the third aspect, the processing module is further configured to generate the scrambling sequence according to the beam identifier by using the following formula:

$b_0(n) = \tilde{b}((n+N_{beam}^{ID}) \bmod 31)$, where $b_0(n)$ represents the scrambling sequence, $N_{beam}^{ID}$ represents the beam identifier, $\tilde{b}(i) = 1 - 2x_1(i)$, $0 \leq i \leq 30$, $x_1(\bar{i}+5) = (a \cdot x_1(\bar{i}+4) + b \cdot x_1(\bar{i}+3) + c \cdot x_1(\bar{i}+2) + d \cdot x_1(\bar{i}+1) + e \cdot x_1(\bar{i})) \bmod 2$, $0 \leq \bar{i} \leq 25$, and a value of each of a, b, c, d, and e is 0 or 1.

With reference to the second possible implementation of the third aspect, in a fourth possible implementation of the third aspect, the processing module is further configured to scramble the first signal according to the generated scrambling sequence by using the following formulas, so as to obtain the second signal:

$$d(2n) = \begin{cases} s_0^{(m_0)}(n)c_0(n)b_0(n) & \text{in a subframe } m \\ s_1^{(m_1)}(n)c_0(n)b_0(n) & \text{in a subframe } n \end{cases}$$

$$d(2n+1) = \begin{cases} s_1^{(m_1)}(n)c_1(n)b_0(n)z_1^{(m_0)}(n) & \text{in a subframe } m \\ s_0^{(m_0)}(n)c_1(n)b_0(n)z_1^{(m_1)}(n) & \text{in a subframe } n \end{cases},$$

where $b_0(n)$ represents the scrambling sequence, $0 \leq n \leq 30$, $d(2n)$ and $d(2n+1)$ represent sequences of the second signal, and the subframe m and the subframe n represent subframes in which the secondary synchronization signal is located;

$s_0^{(m_0)}(n) = \tilde{s}((n+m_0) \bmod 31)$ $s_1^{(m_1)}(n) = \tilde{s}((n+m_1) \bmod 31)$, $\tilde{s}(j) = 1 - 2x_2(j)$, $x_2(\bar{j}+5) = (x_2(\bar{j}+2) + x_2(\bar{j})) \bmod 2$, $0 \leq j \leq 30$, $0 \leq \bar{j} \leq 25$, and $x_2(0)=0$, $x_2(1)=0$, $x_2(2)=0$, $x_2(3)=0$, and $x_2(4)=1$;

$c_0(n) = \tilde{c}((n+N_{ID}^{(2)}) \bmod 31)$ $c_1(n) = \tilde{c}((n+N_{ID}^{(2)}+3) \bmod 31)$, $N_{ID}^{(2)}$ represents a cell identity, $N_{ID}^{(2)} \in \{0,1,2\}$, $\tilde{c}(k) = 1 - 2x_3(k)$, $0 \leq k \leq 30$, $x_3(\bar{k}+5) = (x_3(\bar{k}+3) + x_3(\bar{k})) \bmod 2$, $0 \leq \bar{k} \leq 25$, and $x_3(0)=0$, $x_3(1)=0$, $x_3(2)=0$, $x_3(3)=0$, and $x_3(4)=1$; and $z_0^{(m_0)}(n) = \tilde{z}((n+(m_0 \bmod 8)) \bmod 31)$ $z_1^{(m_1)}(n) = \tilde{z}((n+(m_1 \bmod 8)) \bmod 31)$, $\tilde{z}(r) = 1 - 2x_4(r)$, $0 \leq r \leq 30$, $x_4(\bar{r}+5) = (x_4(\bar{r}+4) + x_4(\bar{r}+2) + x_4(\bar{r}+1) + x_4(\bar{r})) \bmod 2$, $0 \leq \bar{r} \leq 25$, and $x_4(0)=0$, $x_4(1)=0$, $x_4(2)=0$, $x_4(3)=0$, and $x_4(4)=1$.

With reference to the second possible implementation of the third aspect, in a fifth possible implementation of the third aspect, the processing module is further configured to generate scrambling sequences according to the beam identifier and the total beam quantity by using the following formulas:

$b_0(n) = \tilde{b}((n+N_{beam}^{ID}) \bmod 31)$ $b_1(n) = \tilde{b}((n+N_{beam}^{ID}+N_{sumbeam}) \bmod 31)$, where $b_0(n)$ and $b_1(n)$ represent the scrambling sequences, $N_{beam}^{ID}$ represents the beam identifier, $N_{sumbeam}$ represents the total beam quantity, $N_{beam}^{ID} = 0, 1, \ldots, N_{sumbeam}-1$, $\tilde{b}(i) = 1 - 2x_1(i)$, and $0 \leq i \leq 30$; and $x_1(\bar{i}+5) = (a \cdot x_1(\bar{i}+4) + b \cdot x_1(\bar{i}+3) + c \cdot x_1(\bar{i}+2) + d \cdot x_1(\bar{i}+1) + e \cdot x_1(\bar{i})) \bmod 2$, $0 \leq \bar{i} \leq 25$, and a value of each of a, b, c, d, and e is 0 or 1.

With reference to the second possible implementation of the third aspect, in a sixth possible implementation of the third aspect, the processing module is further configured to scramble the first signal according to the generated scrambling sequence by using the following formulas, so as to obtain the second signal:

$$d(2n) = \begin{cases} s_0^{(m_0)}(n)c_0(n)b_0(n) & \text{in a subframe } m \\ s_1^{(m_1)}(n)c_0(n)b_0(n) & \text{in a subframe } n \end{cases}$$

$$d(2n+1) = \begin{cases} s_1^{(m_1)}(n)c_1(n)b_1(n)z_1^{(m_0)}(n) & \text{in a subframe } m \\ s_0^{(m_0)}(n)c_1(n)b_1(n)z_1^{(m_1)}(n) & \text{in a subframe } n \end{cases},$$

where $b_0(n)$ and $b_1(n)$ represent the scrambling sequences, $0 \leq n \leq 30$, $d(2n)$ and $d(2n+1)$ represent sequences of the second signal, and the subframe $m$ and the subframe $n$ represent subframes in which the secondary synchronization signal is located;

$s_0^{(m_0)}(n) = \tilde{s}((n+m_0) \mod 31)$ $s_1^{(m_1)}(n) = \tilde{s}((n+m_1) \mod 31)$, $\tilde{s}(j) = 1 - 2x_2(j)$, $x_2(\bar{j}+5) = (x_2(\bar{j}+2) + x_2(\bar{j})) \mod 2$, $0 \leq j \leq 30$, $0 \leq \bar{j} \leq 25$, and $x_2(0) = 0$, $x_2(1) = 0$, $x_2(2) = 0$, $x_2(3) = 0$, and $x_2(4) = 1$;

$c_0(n) = \tilde{c}((n+N_{ID}^{(2)}) \mod 31)$ $c_1(n) = \tilde{c}((n+N_{ID}^{(2)}+3) \mod 31)$, $N_{ID}^{(2)}$ represents a cell identity, $N_{ID}^{(2)} \in \{0,1,2\}$, $\tilde{c}(k) = 1 - 2x_3(k)$, $0 \leq k \leq 30$, $x_3(\bar{k}+5) = (x_3(\bar{k}+3) + x_3(\bar{k})) \mod 2$, $0 \leq \bar{k} \leq 25$, and $x_3(0) = 0$, $x_3(1) = 0$, $x_3(2) = 0$, $x_3(3) = 0$, and $x_3(4) = 1$; and $z_0^{(m_0)}(n) = \tilde{z}((n+(m_0 \mod 8)) \mod 31)$ $z_1^{(m_1)}(n) = \tilde{z}((n+(m_1 \mod 8)) \mod 31)$, $\tilde{z}(r) = 1 - 2x_4(r)$, $0 \leq r \leq 30$, $x_4(\bar{r}+5) = (x_4(\bar{r}+4) + x_4(\bar{r}+2) + x_4(\bar{r}+1) + x_4(\bar{r})) \mod 2$, $0 \leq \bar{r} \leq 25$, and $x_4(0) = 0$, $x_4(1) = 0$, $x_4(2) = 0$, $x_4(3) = 0$, and $x_4(4) = 1$.

With reference to the third aspect, in a seventh possible implementation of the third aspect, the processing module is further configured to: calculate an initialization value according to the beam identifier, or calculate an initialization value according to the beam identifier and a cell identity; and generate a reference signal according to the calculated initialization value.

With reference to the seventh possible implementation of the third aspect, in an eighth possible implementation of the third aspect, the reference signal is a cell-specific reference signal CRS or a channel state information-reference signal CSI-RS.

With reference to the seventh possible implementation of the third aspect, in a ninth possible implementation of the third aspect, the processing module is further configured to calculate the initialization value according to the beam identifier by using the following formula:

$c_{init} = 2^{10} \cdot (7 \cdot (n_s+1) + l + 1) \cdot (2 \cdot N_{beam}^{ID} + 1) + 2 \cdot N_{beam}^{ID} + N_{CP}$, where $c_{init}$ represents the initialization value, $n_s$ represents a timeslot number, $l$ represents an orthogonal frequency division multiplexing OFDM symbol number, $N_{beam}^{ID}$ represents the beam identifier, and $N_{CP}$ represents a cyclic prefix CP length identifier.

With reference to the seventh possible implementation of the third aspect, in a tenth possible implementation of the third aspect, the processing module is further configured to: generate a specified identifier according to the beam identifier and the cell identity; and calculate the initialization value according to the specified identifier by using the following formula:

$c_{init} = 2^{10} \cdot (7 \cdot (n_s+1) + l + 1) \cdot (2 \cdot N_{ID}^{new} + 1) + 2 \cdot N_{ID}^{new} + N_{CP}$, where $c_{init}$ represents the initialization value, $n_s$ represents a timeslot number, $l$ represents an orthogonal frequency division multiplexing OFDM symbol number, $N_{ID}^{new}$ represents the specified identifier, and $N_{CP}$ represents a cyclic prefix CP length identifier.

With reference to the third aspect, in an eleventh possible implementation of the third aspect, the processing module is configured to generate a beam signal corresponding to the beam identifier, where the beam signal includes the beam identifier;

the processing module is configured to determine a time-frequency resource location of the beam signal; and the sending module is further configured to send the beam signal at the time-frequency resource location of the beam signal by using the beam corresponding to the beam identifier, so that user equipment detecting the beam signal obtains the beam identifier included in the beam signal.

With reference to the eleventh possible implementation of the third aspect, in a twelfth possible implementation of the third aspect, there is a preset spacing between a time-frequency resource location of a third signal and the time-frequency resource location that is of the beam signal and that is determined by the base station.

With reference to the eleventh possible implementation of the third aspect, in a thirteenth possible implementation of the third aspect, the processing module is further configured to determine the time-frequency resource location of the beam signal as a preset time-frequency resource location; and the sending module is further configured to send the beam signal at the preset time-frequency resource location by using the beam corresponding to the beam identifier, so that the user equipment detects the beam signal at the preset time-frequency resource location, and obtains the beam identifier included in the beam signal.

With reference to the eleventh possible implementation of the third aspect, in a fourteenth possible implementation of the third aspect, the sending module is further configured to send time-frequency resource information to the user equipment, where the time-frequency resource information includes a time-frequency resource location identifier of the beam signal, so that the user equipment detects the beam signal at the time-frequency resource location according to the time-frequency resource location identifier.

With reference to the third aspect, in a fifteenth possible implementation of the third aspect, the processing module is further configured to: determine, according to a preset correspondence between a time-frequency resource location identifier and a beam identifier, a time-frequency resource location identifier corresponding to the beam identifier; and configure, to the signal, a time-frequency resource indicated by the time-frequency resource location identifier, so that when the signal is sent by using the beam corresponding to the beam identifier, the user equipment detecting the signal obtains the beam identifier according to the time-frequency resource location identifier of the signal and the correspondence.

With reference to the fifteenth possible implementation of the third aspect, in a sixteenth possible implementation of the third aspect, in the correspondence, a beam identifier corresponding to each time-frequency resource location identifier is obtained by performing modulo operation on the corresponding time-frequency resource location identifier and a total beam quantity; and correspondingly, the processing module configures, to the signal, the time-frequency resource indicated by the time-frequency resource location identifier, so that the user equipment detecting the signal performs modulo operation on the time-frequency resource location identifier of the signal and the total beam quantity, so as to obtain the beam identifier.

With reference to the third aspect, in a seventeenth possible implementation of the third aspect, the sending module is further configured to: if multiple beam identifiers fed back by the user equipment are received, obtain signal strength corresponding to each beam identifier; select one beam identifier from the multiple beam identifiers according to the signal strength corresponding to the multiple beam identifiers; and communicate with the user equipment by using a beam corresponding to the selected beam identifier.

According to a fourth aspect, a beam identifier obtaining apparatus is provided, and the apparatus includes:

a detection module, configured to detect a signal sent by a base station by using a beam, where the signal is corresponding to a beam identifier corresponding to the beam;

a processing module, configured to obtain the beam identifier according to the signal; and a sending module, configured to send the beam identifier to the base station, so that the base station communicates with the apparatus by using the beam corresponding to the beam identifier.

With reference to the fourth aspect, in a first possible implementation of the fourth aspect, the processing module is further configured to: descramble the signal to obtain a scrambling sequence of the signal, and obtain the beam identifier according to the scrambling sequence, where the signal is obtained by the base station by performing scrambling according to the beam identifier; or the processing module is further configured to determine, according to a preset correspondence between a time-frequency resource location identifier and a beam identifier, abeam identifier corresponding to a time-frequency resource location identifier of the signal, where a time-frequency resource location of the signal is determined according to the beam identifier and the correspondence; or the processing module is further configured to: parse the signal to obtain an initialization value of the signal, and obtain the beam identifier according to the initialization value, where the initialization value is calculated by the base station according to the beam identifier; or the processing module is further configured to: obtain a time-frequency resource location identifier of the signal, and perform modulo operation on the time-frequency resource location identifier and a total beam quantity, so as to obtain the beam identifier.

With reference to the fourth aspect, in a second possible implementation of the fourth aspect, the detection module is further configured to detect a beam signal sent by the base station by using the beam, where the beam signal includes the beam identifier.

With reference to the second possible implementation of the fourth aspect, in a third possible implementation of the fourth aspect, the detection module is further configured to detect the beam signal at a location between which and a time-frequency resource location of a third signal there is a preset spacing, where there is the preset spacing between a time-frequency resource location of the beam signal and the time-frequency resource location of the third signal.

With reference to the second possible implementation of the fourth aspect, in a fourth possible implementation of the fourth aspect, the detection module is further configured to detect the beam signal at a preset time-frequency resource location.

With reference to the second possible implementation of the fourth aspect, in a fifth possible implementation of the fourth aspect, the apparatus further includes:

a receiving module, configured to receive time-frequency resource information sent by the base station, where the time-frequency resource information includes a time-frequency resource location identifier of the beam signal; and the detection module is configured to detect the beam signal at the time-frequency resource location according to the time-frequency resource location identifier.

With reference to the fourth aspect, in a sixth possible implementation of the fourth aspect, the apparatus further includes:

the processing module is further configured to: when multiple signals sent by the base station are detected, obtain signal strength of each signal in the multiple signals; and the sending module is further configured to send the signal strength of each signal and a corresponding beam identifier to the base station, so that the base station selects one beam identifier from multiple received beam identifiers according to signal strength corresponding to the multiple beam identifiers, and communicates with the apparatus by using a beam corresponding to the selected beam identifier; or the sending module is further configured to successively send, to the base station in descending order of the signal strength of all the signals, a beam identifier corresponding to each signal, so that the base station selects one beam identifier from the multiple beam identifiers according to a receiving order of all the beam identifiers, and communicates with the apparatus by using a beam corresponding to the selected beam identifier; or the processing module is further configured to select one beam identifier according to signal strength of a signal corresponding to each beam identifier, and the sending module is further configured to send the selected beam identifier to the base station, so that the base station communicates with the apparatus by using a beam corresponding to the beam identifier.

According to a fifth aspect, a base station is provided, and the base station includes a receiver, a transmitter, a memory, and a processor; each of the receiver, the transmitter, and the memory is connected to the processor; the memory stores program code; and the processor is configured to invoke the program code, so as to perform the following operations:

determining a signal corresponding to a beam identifier;

sending the signal by using a beam corresponding to the beam identifier, so that user equipment detecting the signal obtains the beam identifier according to the signal; and when receiving the beam identifier fed back by the user equipment, communicating with the user equipment by using the beam corresponding to the beam identifier.

According to a sixth aspect, user equipment is provided, and the user equipment includes a receiver, a transmitter, a memory, and a processor; each of the receiver, the transmitter, and the memory is connected to the processor; the memory stores program code; and the processor is configured to invoke the program code, so as to perform the following operations:

detecting a signal sent by a base station by using a beam, where the signal is corresponding to a beam identifier corresponding to the beam;

obtaining the beam identifier according to the signal; and sending the beam identifier to the base station, so that the base station communicates with the user equipment by using the beam corresponding to the beam identifier.

According to a seventh aspect, a system is provided, and the system includes a base station and user equipment, where the base station is configured to determine a signal corresponding to a beam identifier;

the base station is further configured to send the signal by using a beam corresponding to the beam identifier;

the user equipment is configured to: detect the signal sent by the base station, and obtain the beam identifier according to the signal;

the user equipment is further configured to send the beam identifier to the base station; and the base station is further configured to: when receiving the beam identifier fed back by the user equipment, communicate with the user equipment by using the beam corresponding to the beam identifier.

Beneficial effects of the technical solutions provided in the embodiments of the present disclosure are as follows:

A base station determines a signal corresponding to a beam identifier, and sends the signal by using a beam corresponding to the beam identifier, so that user equipment detecting the signal can obtain the beam identifier, and feed back the beam identifier to the base station. Therefore, the base station can determine a beam in which the user equipment is currently located, and further communicate with the user equipment by using the beam.

BRIEF DESCRIPTION OF DRAWINGS

To describe the technical solutions in embodiments of the present disclosure more clearly, the following briefly describes the accompanying drawings required for describing the embodiments. Apparently, the accompanying drawings in the following description show merely some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the present disclosure clearer, the following further describes implementations of the present disclosure in detail with reference to the accompanying drawings.

Figure 1:
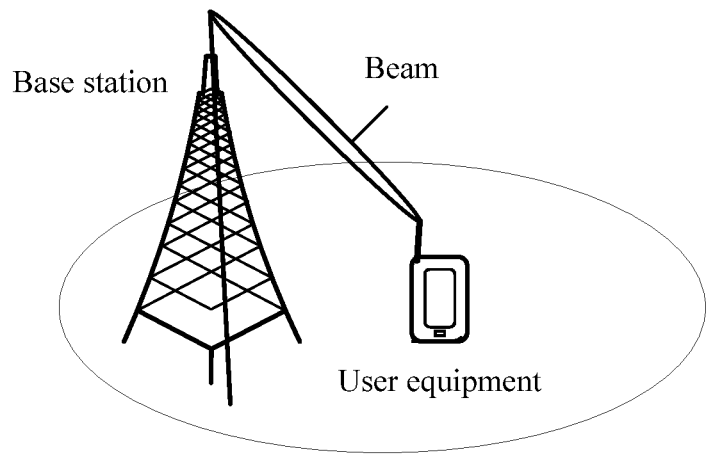
FIG. 1 is a schematic structural diagram of a communications system according to an embodiment of the present disclosure.

FIG. 1 is a schematic structural diagram of a communications system according to an embodiment of the present disclosure. Referring to FIG. 1, the communications system includes a base station and user equipment, and the user equipment is located within a coverage area of the base station.

When a signal is sent by using an antenna of the base station, a beam may be formed, that is, the base station sends the signal by using the beam. In addition, to increase a signal coverage area, the base station may send the signal by using multiple beams. When the user equipment is located within a coverage area of any beam of the base station, the user equipment may detect the signal sent by using the beam, so as to communicate with the base station.

The base station may be abase station that provides a low-band carrier, and this embodiment of the present disclosure is applied to a scenario in which the low-band carrier is used as an independent carrier. Alternatively, the base station may be a base station that provides a millimeter-wave carrier, and this embodiment of the present disclosure is applied to a scenario in which the millimeter-wave carrier is used as an independent carrier. No limitation is imposed in this embodiment of the present disclosure. Further, in this embodiment of the present disclosure, a relatively-low-band carrier and a millimeter-wave carrier may be aggregated, so as to provide higher bandwidth and a larger capacity for a user. The relatively-low-band carrier is used as a primary component carrier, and the millimeter-wave band is used as a secondary component carrier. The primary component carrier and the secondary component carrier may be co-sited, or may be non-co-sited (only a co-site case is used as an example in FIG. 1). In a non-co-site case, a base station that provides the primary component carrier and a base station that provides the secondary component carrier perform backhaul communication by using an optical fiber or a wireless connection between the two base stations. For wireless backhaul, a microwave or millimeter-wave band may be used, and may be the same as or different from a band in which the secondary component carrier is located.

Figure 2:
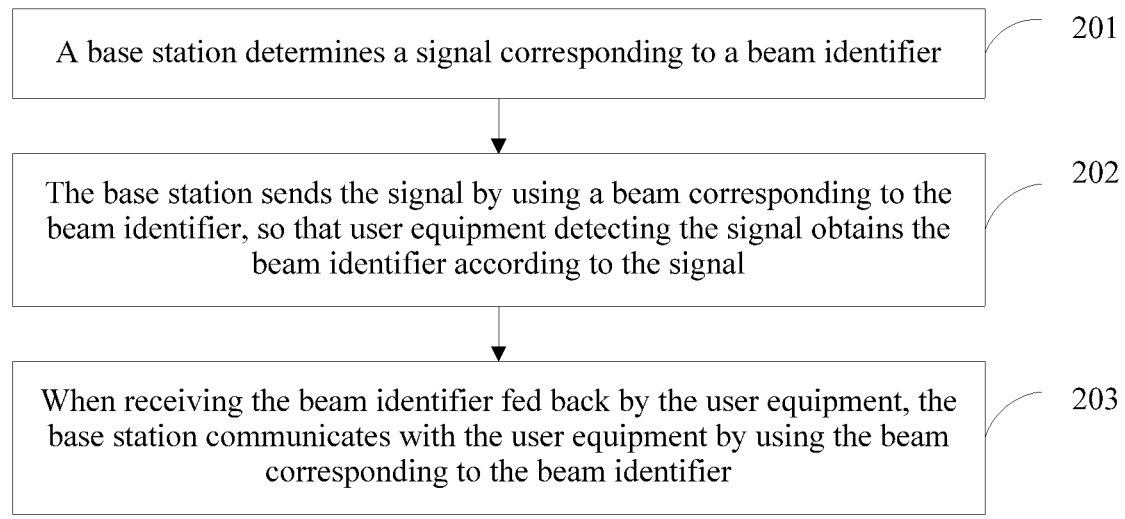
FIG. 2 is a flowchart of a beam identifier obtaining method according to an embodiment of the present disclosure.

FIG. 2 is a flowchart of a beam identifier obtaining method according to an embodiment of the present disclosure. Referring to FIG. 2, this embodiment of the present disclosure is executed by a base station. The method includes the following steps:

201. The base station determines a signal corresponding to a beam identifier.

202. The base station sends the signal by using a beam corresponding to the beam identifier, so that user equipment detecting the signal obtains the beam identifier according to the signal.

203. When receiving the beam identifier fed back by the user equipment, the base station communicates with the user equipment by using the beam corresponding to the beam identifier.

According to the method provided in this embodiment of the present disclosure, a base station determines a signal corresponding to a beam identifier, and sends the signal by using a beam corresponding to the beam identifier, so that user equipment detecting the signal can obtain the beam identifier, and feed back the beam identifier to the base station. Therefore, the base station can determine a beam in which the user equipment is currently located, and further communicate with the user equipment by using the beam.

Optionally, that the base station determines a signal corresponding to a beam identifier includes:

scrambling, by the base station, a first signal according to the beam identifier, so as to obtain a second signal.

Optionally, the scrambling, by the base station, a first signal according to the beam identifier, so as to obtain a second signal includes:

when the first signal is a secondary synchronization signal, generating, by the base station, a scrambling sequence according to the beam identifier, or generating a scrambling sequence according to the beam identifier and a total beam quantity; and scrambling, by the base station, the first signal according to the generated scrambling sequence, so as to obtain the second signal.

Optionally, the generating, by the base station, a scrambling sequence according to the beam identifier includes:

generating, by the base station, the scrambling sequence according to the beam identifier by using the following formula:

$$b_0(n) = \tilde{b}((n+N_{beam}^{ID}) \bmod 31), \text{ where}$$

$b_0(n)$ represents the scrambling sequence, $N_{beam}^{ID}$ represents the beam identifier, $\tilde{b}(i)=1-2x_1(i)$, $0 \le i \le 30$, $x_1(\bar{i}+5)=(a \cdot x_1(\bar{i}+4)+b \cdot x_1(\bar{i}+3)+c \cdot x_1(\bar{i}+2)+d \cdot x_1(\bar{i}+1)+e \cdot x_1(\bar{i})) \bmod 2$, $0 \le \bar{i} \le 25$, and a value of each of a, b, c, d, and e is 0 or 1.

Optionally, the scrambling, by the base station, the first signal according to the generated scrambling sequence, so as to obtain the second signal includes:

scrambling, by the base station, the first signal according to the generated scrambling sequence by using the following formulas, so as to obtain the second signal:

$$d(2n) = \begin{cases} s_0^{(m_0)}(n)c_0(n)b_0(n) & \text{in a subframe } m \\ s_1^{(m_1)}(n)c_0(n)b_0(n) & \text{in a subframe } n \end{cases}$$

$$d(2n+1) = \begin{cases} s_1^{(m_1)}(n)c_1(n)b_0(n)z_1^{(m_0)}(n) & \text{in a subframe } m \\ s_0^{(m_0)}(n)c_1(n)b_0(n)z_1^{(m_1)}(n) & \text{in a subframe } n \end{cases},$$

where $b_0(n)$ represents the scrambling sequence, $0 \le n \le 30$, $d(2n)$ and $d(2n+1)$ represent sequences of the second signal, and the subframe m and the subframe n represent subframes in which the secondary synchronization signal is located;

$$s_0^{(m_0)}(n) = \tilde{s}((n+m_0) \bmod 31)$$

$$s_1^{(m_1)}(n) = \tilde{s}((n+m_1) \bmod 31),$$

$\tilde{s}(j)=1-2x_2(j)$, $x_2(\bar{j}+5)=(x_2(\bar{j}+2)+x_2(\bar{j})) \bmod 2$, $0 \le j \le 30$, $0 \le \bar{j} \le 25$, and $x_2(0)=0$, $x_2(1)=0$, $x_2(2)=0$, $x_2(3)=0$, and $x_2(4)=1$;

$$c_0(n) = \tilde{c}((n+N_{ID}^{(2)}) \bmod 31)$$

$$c_1(n) = \tilde{c}((n+N_{ID}^{(2)}+3) \bmod 31),$$

$N_{ID}^{(2)}$ represents a cell identity, $N_{ID}^{(2)} \in \{0,1,2\}$, $\tilde{c}(k)=1-2x_3(k)$, $0 \le k \le 30$, $x_3(\bar{k}+5)=(x_3(\bar{k}+3)+x_3(\bar{k})) \bmod 2$, $0 \le \bar{k} \le 25$, and $x_3(0)=0$, $x_3(1)=0$, $x_3(2)=0$, $x_3(3)=0$, and $x_3(4)=1$; and $$z_0^{(m_0)}(n) = \tilde{z}((n+(m_0 \bmod 8)) \bmod 31)$$

$$z_1^{(m_1)}(n) = \tilde{z}((n+(m_1 \bmod 8)) \bmod 31),$$

$\tilde{z}(r)=1-2x_4(r)$, $0 \le r \le 30$, $x_4(\bar{r}+5)=(x_4(\bar{r}+4)+x_4(\bar{r}+2)+x_4(\bar{r}+1)+x_4(\bar{r})) \bmod 2$, $0 \le \bar{r} \le 25$, and $x_4(0)=0$, $x_4(1)=0$, $x_4(2)=0$, $x_4(3)=0$, and $x_4(4)=1$.

Optionally, the generating, by the base station, a scrambling sequence according to the beam identifier and a total beam quantity includes:

generating, by the base station, scrambling sequences according to the beam identifier and the total beam quantity by using the following formulas:

$$b_0(n) = \tilde{b}((n+N_{beam}^{ID}) \bmod 31)$$

$$b_1(n) = \tilde{b}((n+N_{beam}^{ID}+N_{sumbeam}) \bmod 31), \text{ where}$$

$b_0(n)$ and $b_1(n)$ represent the scrambling sequences, $N_{beam}^{ID}$ represents the beam identifier, $N_{sumbeam}$ represents the total beam quantity, $N_{beam}^{ID}=0,1,\ldots,N_{sumbeam}-1$, $\tilde{b}(i)=1-2x_1(i)$, and $0 \le i \le 30$; and $x_1(\bar{i}+5)=(a \cdot x_1(\bar{i}+4)+b \cdot x_1(\bar{i}+3)+c \cdot x_1(\bar{i}+2)+d \cdot x_1(\bar{i}+1)+e \cdot x_1(\bar{i})) \bmod 2$, $0 \le \bar{i} \le 25$, and a value of each of a, b, c, d, and e is 0 or 1.

Optionally, the scrambling, by the base station, the first signal according to the generated scrambling sequence, so as to obtain the second signal includes:

scrambling, by the base station, the first signal according to the generated scrambling sequence by using the following formulas, so as to obtain the second signal:

$$d(2n) = \begin{cases} s_0^{(m_0)}(n)c_0(n)b_0(n) & \text{in a subframe } m \\ s_1^{(m_1)}(n)c_0(n)b_0(n) & \text{in a subframe } n \end{cases}$$

$$d(2n+1) = \begin{cases} s_1^{(m_1)}(n)c_1(n)b_1(n)z_1^{(m_0)}(n) & \text{in a subframe } m \\ s_0^{(m_0)}(n)c_1(n)b_1(n)z_1^{(m_1)}(n) & \text{in a subframe } n \end{cases},$$

where $b_0(n)$ and $b_1(n)$ represent the scrambling sequences, $0 \le n \le 30$, $d(2n)$ and $d(2n+1)$ represent sequences of the second signal, and the subframe m and the subframe n represent subframes in which the secondary synchronization signal is located;

$$s_0^{(m0)}(n)=\tilde{s}((n+m_0)\bmod 31)$$

$$s_1^{(m1)}(n)=\tilde{s}((n+m_1)\bmod 31),$$

$\tilde{s}(j)=1-2x_2(j)$, $x_2(\bar{j}+5)=(x_2(\bar{j}+2)+x_2(\bar{j}))\bmod 2$, $0 \leq j \leq 30$, $0 \leq \bar{j} \leq 25$, and $x_2(0)=0$, $x_2(1)=0$, $x_2(2)=0$, $x_2(3)=0$, and $x_2(4)=1$;

$$c_0(n)=\tilde{c}((n+N_{ID}^{(2)})\bmod 31)$$

$$c_1(n)=\tilde{c}((n+N_{ID}^{(2)}+3)\bmod 31),$$

$N_{ID}^{(2)}$ represents a cell identity, $N_{ID}^{(2)} \in \{0,1,2\}$, $\tilde{c}(k)=1-2x_3(k)$, $0 \leq k \leq 30$, $x_3(\bar{k}+5)=(x_3(\bar{k}+3)+x_3(\bar{k}))\bmod 2$, $0 \leq \bar{k} \leq 25$, and $x_3(0)=0$, $x_3(1)=0$, $x_3(2)=0$, $x_3(3)=0$, and $x_3(4)=1$; and $$z_0^{(m0)}(n)=\tilde{z}((n+(m_0 \bmod 8))\bmod 31)$$

$$z_1^{(m1)}(n)=\tilde{z}((n+(m_1 \bmod 8))\bmod 31),$$

$\tilde{z}(r)=1-2x_4(r)$, $0 \leq r \leq 30$, $x_4(\bar{r}+5)=(x_4(\bar{r}+4)+x_4(\bar{r}+2)+x_4(\bar{r}+1)+x_4(\bar{r}))\bmod 2$, $0 \leq \bar{r} \leq 25$, and $x_4(0)=0$, $x_4(1)=0$, $x_4(2)=0$, $x_4(3)=0$, and $x_4(4)=1$.

Optionally, that the base station determines a signal corresponding to a beam identifier includes:

calculating, by the base station, an initialization value according to the beam identifier, or calculating an initialization value according to the beam identifier and a cell identity; and generating a reference signal according to the calculated initialization value.

Optionally, the reference signal is a cell-specific reference signal CRS or a channel state information-reference signal CSI-RS.

Optionally, the calculating, by the base station, an initialization value according to the beam identifier includes:

calculating, by the base station, the initialization value according to the beam identifier by using the following formula:

$$c_{init}=2^{10} \cdot (7 \cdot (n_s+1)+l+1) \cdot (2 \cdot N_{beam}^{ID}+1)+2 \cdot N_{beam}^{ID}+N_{CP}, \text{ where}$$

$c_{init}$ represents the initialization value, $n_s$ represents a timeslot number, l represents an orthogonal frequency division multiplexing OFDM symbol number, $N_{beam}^{ID}$ represents the beam identifier, and $N_{CP}$ represents a cyclic prefix CP length identifier.

Optionally, the calculating, by the base station, an initialization value according to the beam identifier and a cell identity includes:

generating, by the base station, a specified identifier according to the beam identifier and the cell identity; and calculating, by the base station, the initialization value according to the specified identifier by using the following formula:

$$c_{init}=2^{10} \cdot (7 \cdot (n_s+1)+l+1) \cdot (2 \cdot N_{ID}^{new}+1)+2 \cdot N_{ID}^{new}+N_{CP}, \text{ where}$$

$c_{init}$ represents the initialization value, $n_s$ represents a timeslot number, l represents an orthogonal frequency division multiplexing OFDM symbol number, $N_{ID}^{new}$ represents the specified identifier, and $N_{CP}$ represents a cyclic prefix CP length identifier.

Optionally, that the base station determines a signal corresponding to a beam identifier includes:

generating, by the base station, a beam signal corresponding to the beam identifier, where the beam signal includes the beam identifier.

Correspondingly, the method further includes:

determining, by the base station, a time-frequency resource location of the beam signal; and sending, by the base station, the beam signal at the time-frequency resource location of the beam signal by using the beam corresponding to the beam identifier, so that user equipment detecting the beam signal obtains the beam identifier included in the beam signal.

Optionally, there is a preset spacing between a time-frequency resource location of a third signal and the time-frequency resource location that is of the beam signal and that is determined by the base station.

Optionally, the method further includes:

determining, by the base station, the time-frequency resource location of the beam signal as a preset time-frequency resource location; and sending, by the base station, the beam signal at the preset time-frequency resource location by using the beam corresponding to the beam identifier, so that the user equipment detects the beam signal at the preset time-frequency resource location, and obtains the beam identifier included in the beam signal.

Optionally, after the base station sends the beam signal at the time-frequency resource location of the beam signal by using the beam corresponding to the beam identifier, the method further includes:

sending, by the base station, time-frequency resource information to the user equipment, where the time-frequency resource information includes a time-frequency resource location identifier of the beam signal, so that the user equipment detects the beam signal at the time-frequency resource location according to the time-frequency resource location identifier.

Optionally, that the base station determines a signal corresponding to a beam identifier includes:

determining, by the base station according to a preset correspondence between a time-frequency resource location identifier and a beam identifier, a time-frequency resource location identifier corresponding to the beam identifier; and configuring, by the base station to the signal, a time-frequency resource indicated by the time-frequency resource location identifier, so that when the signal is sent by using the beam corresponding to the beam identifier, the user equipment detecting the signal obtains the beam identifier according to the time-frequency resource location identifier of the signal and the correspondence.

Optionally, in the correspondence, a beam identifier corresponding to each time-frequency resource location identifier is obtained by performing modulo operation on the corresponding time-frequency resource location identifier and a total beam quantity.

Correspondingly, the base station configures, to the signal, the time-frequency resource indicated by the time-frequency resource location identifier, so that the user equipment detecting the signal performs modulo operation on the time-frequency resource location identifier of the signal and the total beam quantity, so as to obtain the beam identifier.

Optionally, that the base station communicates with the user equipment by using the beam corresponding to the beam identifier includes:

if the base station receives multiple beam identifiers fed back by the user equipment, obtaining signal strength corresponding to each beam identifier;

selecting, by the base station, one beam identifier from the multiple beam identifiers according to the signal strength corresponding to the multiple beam identifiers; and communicating, by the base station, with the user equipment by using a beam corresponding to the selected beam identifier.

All the optional technical solutions may be combined in any manner to form an optional embodiment of the present disclosure. Details are not further described herein one by one.

Figure 3:
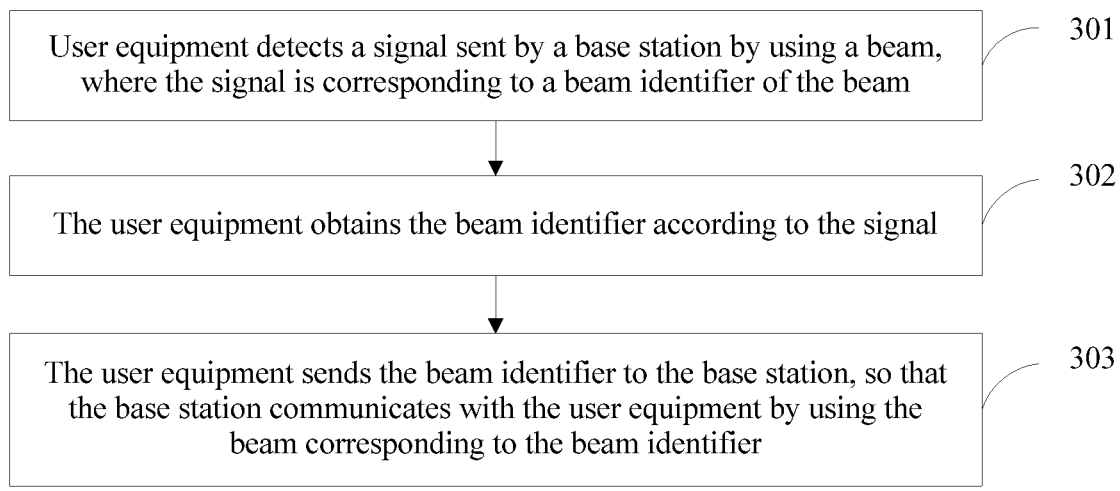
FIG. 3 is a flowchart of a beam identifier obtaining method according to an embodiment of the present disclosure.

FIG. 3 is a flowchart of a beam identifier obtaining method according to an embodiment of the present disclosure. Referring to FIG. 3, this embodiment of the present disclosure is executed by user equipment. The method includes the following steps:

301. The user equipment detects a signal sent by a base station by using a beam, where the signal is corresponding to a beam identifier of the beam.

302. The user equipment obtains the beam identifier according to the signal.

303. The user equipment sends the beam identifier to the base station, so that the base station communicates with the user equipment by using the beam corresponding to the beam identifier.

According to the method provided in this embodiment of the present disclosure, a base station sends, by using a beam, a signal corresponding to a beam identifier, so that when detecting the signal, user equipment can obtain the beam identifier, and send the beam identifier to the base station. Therefore, the base station can determine, according to the beam identifier, a beam in which the user equipment is currently located, and further communicate with the user equipment by using the beam.

Optionally, the user equipment detects the signal sent by the base station by using the beam. The signal is corresponding to the beam identifier corresponding to the beam.

The user equipment obtains the beam identifier according to the signal.

The user equipment sends the beam identifier to the base station, so that the base station communicates with the user equipment by using the beam corresponding to the beam identifier.

Optionally, that the user equipment obtains the beam identifier according to the signal includes:

descrambling, by the user equipment, the signal to obtain a scrambling sequence of the signal, and obtaining the beam identifier according to the scrambling sequence, where the signal is obtained by the base station by performing scrambling according to the beam identifier; or parsing, by the user equipment, the signal to obtain an initialization value of the signal, and obtaining the beam identifier according to the initialization value, where the initialization value is calculated by the base station according to the beam identifier; or determining, by the user equipment according to a preset correspondence between a time-frequency resource location identifier and a beam identifier, a beam identifier corresponding to a time-frequency resource location identifier of the signal, where a time-frequency resource location of the signal is determined according to the beam identifier and the correspondence; or obtaining, by the user equipment, a time-frequency resource location identifier of the signal, and performing modulo operation on the time-frequency resource location identifier and a total beam quantity, so as to obtain the beam identifier.

Optionally, that the user equipment detects a signal sent by a base station by using a beam includes:

detecting, by the user equipment, a beam signal sent by the base station by using the beam, where the beam signal includes the beam identifier.

Optionally, the detecting, by the user equipment, a beam signal sent by the base station by using the beam includes:

detecting, by the user equipment, the beam signal at a location between which and a time-frequency resource location of a third signal there is a preset spacing, where there is the preset spacing between a time-frequency resource location of the beam signal and the time-frequency resource location of the third signal.

Optionally, the detecting, by the user equipment, a beam signal sent by the base station by using the beam includes:

detecting, by the user equipment, the beam signal at a preset time-frequency resource location.

Optionally, before the detecting, by the user equipment, a beam signal sent by the base station by using the beam, the method further includes:

receiving, by the user equipment, time-frequency resource information sent by the base station, where the time-frequency resource information includes a time-frequency resource location identifier of the beam signal; and detecting, by the user equipment, the beam signal at the time-frequency resource location according to the time-frequency resource location identifier.

Optionally, the method further includes:

when detecting multiple signals sent by the base station, obtaining, by the user equipment, signal strength of each signal in the multiple signals; and sending, by the user equipment, the signal strength of each signal and a corresponding beam identifier to the base station, so that the base station selects one beam identifier from multiple received beam identifiers according to signal strength corresponding to the multiple beam identifiers, and communicates with the user equipment by using a beam corresponding to the selected beam identifier; or successively sending, by the user equipment to the base station in descending order of the signal strength of all the signals, a beam identifier corresponding to each signal, so that the base station selects one beam identifier from the multiple beam identifiers according to a receiving order of all the beam identifiers, and communicates with the user equipment by using a beam corresponding to the selected beam identifier; or selecting, by the user equipment, one beam identifier according to signal strength of a signal corresponding to each beam identifier, and sending the selected beam identifier to the base station, so that the base station communicates with the user equipment by using a beam corresponding to the beam identifier.

All the optional technical solutions may be combined in any manner to form an optional embodiment of the present disclosure. Details are not further described herein one by one.

In a next embodiment, a beam identifier obtaining method provided in this embodiment of the present disclosure is described by using an example that a signal corresponding to a beam identifier is a secondary synchronization signal. For ease of description, before this embodiment of the present disclosure is described in detail, the secondary synchronization signal is first described as follows:

In an existing LTE (Long Term Evolution) system, a synchronization signal includes a PSS (primary synchronization signal) and an SSS (secondary synchronization signal). In a given cell, a base station transmits a specific sequence of a PSS and that of an SSS to user equipment, so as to indicate a physical layer cell identifier to the user equipment. There are 504 different physical layer cell identifiers in LTE. The 504 different physical layer cell identifiers are grouped into 168 groups, and each group includes three identifiers. Three PSS sequences are used to represent cell identities $N_{ID}^{(2)}$ in a group, 168 SSS sequences are used to represent group identifiers $N_{ID}^{(1)}$, and $N_{ID}^{cell}=3N_{ID}^{(1)}+N_{ID}^{(2)}$.

In an FDD (frequency division duplex) manner, the PSS is located in the last OFDM (orthogonal frequency division multiplexing) symbol in the first timeslot and that in the eleventh timeslot, and the SSS is directly located before the PSS. In a TDD (time division duplex) manner, the PSS is located in the third symbol in the third timeslot and that in the thirteenth timeslot, and the SSS is three symbols earlier than the PSS, that is, the SSS is located in the last symbol in the second timeslot and that in the twelfth timeslot.

Persons skilled in the art may learn that, one radio frame includes 10 subframes, subframe numbers are 0 to 9, and one subframe includes two timeslots. Timeslot numbers within one radio frame are 0 to 19. For a normal CP (cyclic prefix), one timeslot includes seven symbols. For an extended CP, one timeslot includes six symbols.

For either the normal CP or the extended CP, the first timeslot and the second timeslot are located in a subframe 0, the third timeslot is located in a subframe 1, the eleventh timeslot and the twelfth timeslot are located in a subframe 5, and the thirteenth timeslot is located in a subframe 6. That is, in the FDD manner, both the PSS and the SSS are located in the subframe 0 and the subframe 5. In the TDD manner, the PSS is located in the subframe 1 and the subframe 6, and the SSS is located in the subframe 0 and the subframe 5.

The SSS sequence is obtained according to the following formulas by interleaving two M sequences whose lengths are 31; the two M sequences SSC1 and SSC2 are generated by performing different cyclic shift on a same M sequence whose length is 31; and the SSS sequence is scrambled by using code related to the PSS:

$$d(2n) = \begin{cases} s_0^{(m_0)}(n)c_0(n) & \text{in a subframe 0} \\ s_1^{(m_1)}(n)c_0(n) & \text{in a subframe 5} \end{cases}$$

$$d(2n+1) = \begin{cases} s_1^{(m_1)}(n)c_1(n)z_1^{(m_0)}(n) & \text{in a subframe 0} \\ s_0^{(m_0)}(n)c_1(n)z_1^{(m_1)}(n) & \text{in a subframe 5} \end{cases},$$

where $0 \leq n \leq 30$, and $m_0$ and $m_1$ may be obtained according to a mapping relationship between a cell group identifier $N_{ID}^{(1)}$ and each of $m_0$ and $m_1$.

Two sequences $s_0^{(m_0)}(n)$ and $s_1^{(m_1)}(n)$ are two different cyclic shifts of an M sequence $\tilde{s}(n)$, and are generated according to the following formulas:

$s_0^{(m_0)}(n)=\tilde{s}((n+m_0)\mod 31)$ $s_1^{(m_1)}(n)=\tilde{s}((n+m_1)\mod 31)$, where $\tilde{s}(i)=1-2x(i)$, $0 \leq i \leq 30$, and is defined as follows:
$x(\bar{i}+5)=(x(\bar{i}+2)+x(\bar{i}))\mod 2$, $0 \leq \bar{i} \leq 25$, where
an initial condition is: $x(0)=0$, $x(1)=0$, $x(2)=0$, $x(3)=0$, $x(4)=1$.

Two scrambling sequences $c_0(n)$ and $c_1(n)$ are generated according to the primary synchronization signal, are two different cyclic shifts of an M sequence $\tilde{c}(n)$, and are generated according to the following formulas:

$c_0(n)=\tilde{c}((n+N_{ID}^{(2)})\mod 31)$ $c_1(n)=\tilde{c}((n+N_{ID}^{(2)}+3)\mod 31)$, where $N_{ID}^{(2)} \in \{0,1,2\}$ is a physical layer cell group identifier $N_{ID}^{(1)}$, $\tilde{c}(i)=1-2x(i)$, $0 \leq i \leq 30$, and is defined as follows:
$x(\bar{i}+5)=(x(\bar{i}+3)+x(\bar{i}))\mod 2$, $0 \leq \bar{i} \leq 25$, where
an initial condition is: $x(0)=0$, $x(1)=0$, $x(2)=0$, $x(3)=0$, $x(4)=1$.

Scrambling sequences $z_1^{(m_0)}(n)$ and $z_1^{(m_1)}(n)$ are obtained by performing cyclic shift on an M sequence $\tilde{z}(n)$, and specific formulas are as follows:

$z_1^{(m_0)}(n)=\tilde{z}((n+(m_0 \mod 8))\mod 31)$, and $z_1^{(m_1)}(n)=\tilde{z}((n+(m_1 \mod 8))\mod 31)$, where $\tilde{z}(i)=1-2x(i)$, $0 \leq i \leq 30$, and is defined as follows:
$x(\bar{i}+5)=(x(\bar{i}+4)+x(\bar{i}+2)+x(\bar{i}+1)+x(\bar{i}))\mod 2$, $0 \leq \bar{i} \leq 25$, where
an initial condition is: $x(0)=0$, $x(1)=0$, $x(2)=0$, $x(3)=0$, $x(4)=1$.

Figure 4:
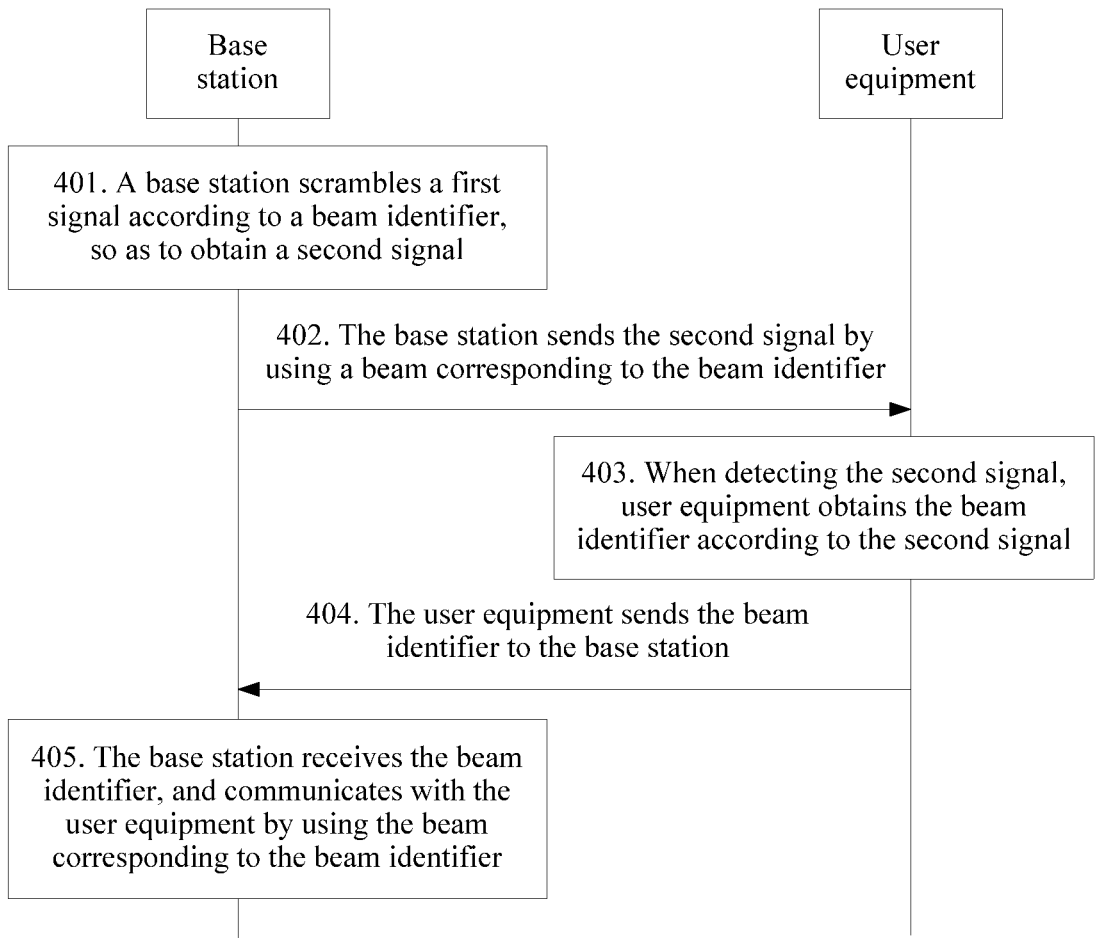
FIG. 4 is a flowchart of a beam identifier obtaining method according to an embodiment of the present disclosure.

FIG. 4 is a flowchart of a beam identifier obtaining method according to an embodiment of the present disclosure. Referring to FIG. 4, interaction entities in this embodiment of the present disclosure are a base station and user equipment. In addition, in this embodiment of the present disclosure, an example that the base station scrambles a first signal according to a beam identifier, so as to obtain a second signal, and no longer sends the first signal subsequently but sends the second signal corresponding to the beam identifier is used, and the first signal is a secondary synchronization signal. The method includes the following steps.

401. The base station scrambles a first signal according to a beam identifier, so as to obtain a second signal.

In this embodiment of the present disclosure, the base station may determine a beam identifier of each beam in advance. One beam is corresponding to one beam identifier. The beam identifier may be an index or a number of the corresponding beam or another identifier that can be used to uniquely determine the corresponding beam. No limitation is imposed in this embodiment of the present disclosure.

A secondary synchronization signal sending process is used as an example in this embodiment of the present disclosure. Before sending a secondary synchronization signal, the base station first determines a beam identifier corresponding to a beam that is to be used to send the secondary synchronization signal, and scrambles the secondary synchronization signal according to the beam identifier. Scrambling information of the secondary synchronization signal not only includes a cell identity, but also includes the beam identifier, so that a secondary synchronization signal obtained by means of scrambling also includes the beam identifier.

Step 401 may include the following steps: The base station generates a scrambling sequence according to the beam identifier and a total beam quantity, and scrambles the first signal according to the scrambling sequence, so as to obtain the second signal.

Specifically, the base station generates scrambling sequences according to the beam identifier and the total beam quantity by using the following formulas:

$b_0(n)=\tilde{b}((n+N_{beam}^{ID})\mod 31)$ $b_1(n)=\tilde{b}((n+N_{beam}^{ID}+N_{sumbeam})\mod 31)$, where $b_0(n)$ and $b_1(n)$ represent the scrambling sequences, $N_{beam}^{ID}$ represents the beam identifier, $N_{sumbeam}$ represents the total beam quantity, $N_{beam}^{ID}=0,1,\ldots,N_{sumbeam}-1$, $\tilde{b}(i)=1-2x_1(i)$, and $0\leq i\leq 30$; and $x_1(\bar{i}+5)=(a\cdot x_1(\bar{i}+4)+b\cdot x_1(\bar{i}+3)+c\cdot x_1(\bar{i}+2)+d\cdot x_1(\bar{i}+1)+e\cdot x_1(\bar{i}))\bmod 2$, $0\leq\bar{i}\leq 25$, and a value of each of a, b, c, d, and e is 0 or 1.

The base station scrambles the first signal according to the scrambling sequences by using the following formulas, so as to obtain the second signal:

$$d(2n) = \begin{cases} s_0^{(m_0)}(n)c_0(n)b_0(n) & \text{in a subframe m} \\ s_1^{(m_1)}(n)c_0(n)b_0(n) & \text{in a subframe n} \end{cases}$$

$$d(2n+1) = \begin{cases} s_1^{(m_1)}(n)c_1(n)b_1(n)z_1^{(m_0)}(n) & \text{in a subframe m} \\ s_0^{(m_0)}(n)c_1(n)b_1(n)z_1^{(m_1)}(n) & \text{in a subframe n} \end{cases}$$

where $d(2n)$ and $d(2n+1)$ represent sequences of the secondary synchronization signal, the subframe m and the subframe n are subframes in which the secondary synchronization signal is located, and n is greater than m;

$$s_0^{(m_0)}(n)=\tilde{s}((n+m_0)\bmod 31)$$

$$s_1^{(m_1)}(n)=\tilde{s}((n+m_1)\bmod 31),$$

$\tilde{s}(j)=1-2x_2(j)$, $x_2(\bar{j}+5)=(x_2(\bar{j}+2)+x_2(\bar{j}))\bmod 2$, $0\leq j\leq 30$, $0\leq\bar{j}\leq 25$, and $x_2(0)=0$, $x_2(1)=0$, $x_2(2)=0$, $x_2(3)=0$, and $x_2(4)=1$;

$$c_0(n)=\tilde{c}((n+N_{ID}^{(2)})\bmod 31)$$

$$c_1(n)=\tilde{c}((n+N_{ID}^{(2)}+3)\bmod 31),$$

$N_{ID}^{(2)}$ represents a cell identity, $N_{ID}^{(2)}\in\{0,1,2\}$, $\tilde{c}(k)=1-2x_3(k)$, $0\leq k\leq 30$, $x_3(\bar{k}+5)=(x_3(\bar{k}+3)+x_3(\bar{k}))\bmod 2$, $0\leq\bar{k}\leq 25$, and $x_3(0)=0$, $x_3(1)=0$, $x_3(2)=0$, $x_3(3)=0$, and $x_3(4)=1$;

$$z_0^{(m_0)}(n)=\tilde{z}((n+(m_0\bmod 8))\bmod 31)$$

$$z_1^{(m_1)}(n)=\tilde{z}((n+(m_1\bmod 8))\bmod 31),$$

$\tilde{z}(r)=1-2x_4(r)$, $0\leq r\leq 30$, $x_4(\bar{r}+5)=(x_4(\bar{r}+4)+x_4(\bar{r}+2)+x_4(\bar{r}+1)+x_4(\bar{r}))\bmod 2$, $0\leq\bar{r}\leq 25$, and $x_4(0)=0$, $x_4(1)=0$, $x_4(2)=0$, $x_4(3)=0$, and $x_4(4)=1$; and $b_0(n)$ and $b_1(n)$ represent the scrambling sequences, and $0\leq n\leq 30$.

Alternatively, when the first signal is scrambled, a location of $b_0(n)$ and that of $b_1(n)$ may be interchanged, that is, the base station may scramble the first signal according to the scrambling sequences by using the following formulas, so as to obtain the second signal:

$$d(2n) = \begin{cases} s_0^{(m_0)}(n)c_0(n)b_1(n) & \text{in a subframe m} \\ s_1^{(m_1)}(n)c_0(n)b_1(n) & \text{in a subframe n} \end{cases}$$

$$d(2n+1) = \begin{cases} s_1^{(m_1)}(n)c_1(n)b_0(n)z_1^{(m_0)}(n) & \text{in a subframe m} \\ s_0^{(m_0)}(n)c_1(n)b_0(n)z_1^{(m_1)}(n) & \text{in a subframe n} \end{cases}$$

In addition, step 401 may include the following steps: The base station generates a scrambling sequence according to the beam identifier, and scrambles the first signal according to the scrambling sequence, so as to obtain the second signal.

Specifically, the base station generates the scrambling sequence according to the beam identifier by using the following formula:

$$b_0(n)=\tilde{b}((n+N_{beam}^{ID})\bmod 31);\text{ and}$$

scrambles the first signal according to the scrambling sequence by using the following formulas, so as to obtain the second signal:

$$d(2n) = \begin{cases} s_0^{(m_0)}(n)c_0(n)b_0(n) & \text{in a subframe m} \\ s_1^{(m_1)}(n)c_0(n)b_0(n) & \text{in a subframe n} \end{cases}$$

$$d(2n+1) = \begin{cases} s_1^{(m_1)}(n)c_1(n)b_0(n)z_1^{(m_0)}(n) & \text{in a subframe m} \\ s_0^{(m_0)}(n)c_1(n)b_0(n)z_1^{(m_1)}(n) & \text{in a subframe n} \end{cases}$$

It should be noted that, the base station may scramble the secondary synchronization signal according to the beam identifier in another manner, so that a signal obtained by means of scrambling includes the beam identifier. No limitation is imposed in this embodiment of the present disclosure.

Compared with the prior art, according to this embodiment of the present disclosure, a secondary synchronization signal that is scrambled by using a cell identity and a beam identifier is designed, so that a sent secondary synchronization signal not only includes the cell identity but also includes the beam identifier, and user equipment detecting the second signal may obtain the beam identifier according to the second signal.

402. The base station sends the second signal by using a beam corresponding to the beam identifier.

403. When detecting the second signal, the user equipment obtains the beam identifier according to the second signal.

The base station sends the second signal by using the beam corresponding to the beam identifier. If the user equipment is located within a signal coverage area of the beam, the user equipment detects the second signal, descrambles the second signal to obtain a scrambling sequence of the second signal, and obtains the beam identifier according to the scrambling sequence. Therefore, a beam in which the user equipment is currently located is determined.

404. The user equipment sends the beam identifier to the base station.

405. The base station receives the beam identifier, and communicates with the user equipment by using the beam corresponding to the beam identifier.

After obtaining a beam identifier, the user equipment may send the beam identifier to the base station, so that the base station can determine, according to the beam identifier, a beam in which the user equipment is currently located. In a subsequent process, the base station may communicate with the user equipment by using the beam corresponding to the beam identifier. For example, when the base station needs to send a signal to the user equipment, the base station needs to send the signal only by using the beam in which the user equipment is currently located, and does not need to send the signal by using multiple beams, so that a throughput is increased, and resource utilization is improved.

In this embodiment of the present disclosure, when detecting the second signal, the user equipment may further detect signal strength of the second signal, and the user equipment may further send the signal strength to the base station. The base station may determine the signal strength of the signal detected by the user equipment.

Further, when detecting multiple second signals sent by the base station, the user equipment obtains signal strength of each second signal. In this case, the user equipment may successively send, to the base station in descending order of the signal strength of all the second signals, a beam identifier corresponding to each second signal. The base station may determine, according to a receiving order of all beam identifiers, signal strength corresponding to each beam. The base station may select one beam identifier from the multiple beam identifiers, and communicate with the user equipment by using a beam corresponding to the selected beam identifier. Optionally, the base station may select the first received beam identifier, that is, a beam identifier corresponding to maximum signal strength, and communicate with the user equipment by using a beam corresponding to the beam identifier corresponding to maximum signal strength.

In addition, the user equipment may select one beam identifier according to signal strength of a second signal corresponding to each beam identifier, and send the selected beam identifier to the base station. The base station communicates with the user equipment by using a beam corresponding to the beam identifier. Optionally, the user equipment selects a beam identifier corresponding to a second signal with maximum signal strength, and sends the selected beam identifier to the base station, so that the base station communicates with the user equipment according to a beam corresponding to the selected beam identifier.

Alternatively, the user equipment may send the signal strength of each second signal and a corresponding beam identifier to the base station, so that the base station selects one beam identifier from multiple received beam identifiers according to signal strength corresponding to the multiple beam identifiers, and communicates with the user equipment by using a beam corresponding to the selected beam identifier. Optionally, the base station selects, from the multiple received beam identifiers according to the signal strength corresponding to the multiple beam identifiers, a beam identifier corresponding to maximum signal strength, and communicates with the user equipment by using a beam corresponding to the beam identifier with maximum signal strength.

In this embodiment of the present disclosure, a beam corresponding to maximum signal strength detected by the user equipment is used as an optimal beam. The base station communicates with the user equipment by using the determined optimal beam, and can perform beam switching in a timely manner. Therefore, when a signal coverage area is ensured, resource utilization is improved and a throughput is increased.

In addition, in a subsequent process in which the base station communicates with the user equipment, the beam in which the user equipment is located may change. The base station and the user equipment may perform the steps again, so as to obtain a beam identifier updated by the user equipment, and the base station may continue to communicate with the user equipment by using an updated beam.

According to the method provided in this embodiment of the present disclosure, a base station scrambles a first signal according to a beam identifier, so as to obtain a second signal, so that the second signal includes the beam identifier; and sends the second signal by using a beam corresponding to the beam identifier, so that user equipment detecting the second signal can obtain the beam identifier, and feed back the beam identifier to the base station. Therefore, the base station can determine, according to the beam identifier, a beam in which the user equipment is currently located, communicate with the user equipment by using the beam in which the user equipment is currently located, and does not need to communicate with the user equipment by using multiple beams, thereby increasing a throughput and improving resource utilization.

In a next embodiment, a beam identifier obtaining method provided in this embodiment of the present disclosure is described by using an example that a signal corresponding to a beam identifier is a CRS (Cell-specific Reference Signal, cell-specific reference signal). For ease of description, before this embodiment of the present disclosure is described in detail, the CRS is first described as follows:

In an existing LTE system, a CRS is used by user equipment to demodulate a control channel and data, and may be used by the user equipment to perform CSI feedback. A reference-signal sequence $r_{l,n_s}(m)$ of the CRS is defined as follows:

$$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, 2N_{RB}^{max,DL} - 1,$$

where $n_s$ is a timeslot number within a radio frame, l is an OFDM symbol number within a timeslot, and c(i) is a pseudo-random sequence.

A pseudo-random sequence c(n) is defined by using a Gold sequence whose length is 31. A length is $M_{PN}$, n=0,1 . . . , $M_{PN-1}$, and c(n) is defined as follows:

$$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2,$$
where $N_C$=1600, a first M sequence x(n) is initialized as $x_1(0)$=1, $x_1(n)$=0, n=1,2, . . . , 30, an initialization value of the first M sequence is fixed, and an initialization value of a second M sequence is:

$$c_{init} = 2^{10} \cdot (7 \cdot (n_s+1) + l + 1) \cdot (2 \cdot N_{ID}^{cell} + 1) + 2 \cdot N_{ID}^{cell} + N_{CP},$$
where $N_{ID}^{cell}$ is a cell identity, and $$N_{CP} = \begin{cases} 1 & \text{for a normal } CP \\ 0 & \text{for an extended } CP \end{cases}.$$

Figure 5A:
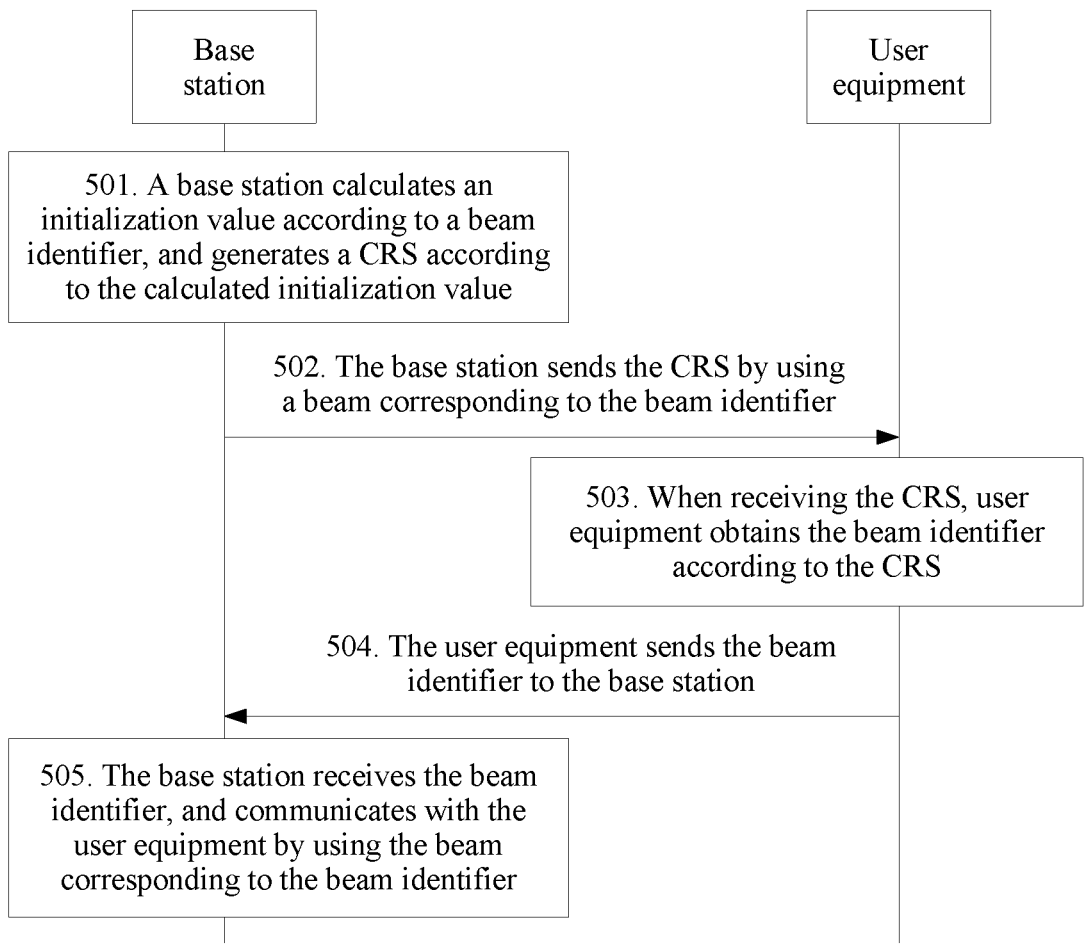
FIG. 5A is a flowchart of a beam identifier obtaining method according to an embodiment of the present disclosure.

FIG. 5A is a flowchart of a beam identifier obtaining method according to an embodiment of the present disclosure. Referring to FIG. 5A, interaction entities in this embodiment of the present disclosure are a base station and user equipment. The method includes the following steps.

501. The base station calculates an initialization value according to a beam identifier, and generates a CRS according to the calculated initialization value.

A CRS sending process is used as an example in this embodiment of the present disclosure. Before sending a CRS, the base station first determines a beam identifier corresponding to a beam that is to be used to send the CRS, calculates an initialization value of the CRS according to the beam identifier, and generates a sequence of the CRS according to the initialization value.

One beam is corresponding to one beam identifier. The beam identifier may be a number of the corresponding beam or another identifier that can uniquely determine the corresponding beam. No limitation is imposed in this embodiment of the present disclosure.

Specifically, the base station calculates the initialization value according to the beam identifier by using the following formula:

$$c_{init}=2^{10}\cdot(7\cdot(n_s+1)+l+1)\cdot(2\cdot N_{beam}^{ID}+1)+2\cdot N_{beam}^{ID}+N_{CP}, \text{ where}$$

$c_{init}$ represents the initialization value, $n_s$ represents a timeslot number, l represents an orthogonal frequency division multiplexing OFDM symbol number, $N_{beam}^{ID}$ represents the beam identifier, and $N_{CP}$ represents a CP length identifier.

Persons skilled in the art may learn that an initialization value of a first M sequence of a scrambling sequence of the CRS is fixed, and an initialization value $c_{init}$ of a second M sequence directly affects a generated scrambling sequence. However, in this embodiment of the present disclosure, after calculating the initialization value, the base station generates the sequence of the CRS according to the initialization value. The sequence of the CRS includes the beam identifier. The beam identifier may be obtained according to the sequence of the CRS.

In this embodiment of the present disclosure, step 501 may further include the following step: The base station calculates an initialization value according to the beam identifier and a cell identity, and generates a CRS according to the calculated initialization value.

Specifically, the base station generates a new specified identifier according to the beam identifier and the cell identity. The specified identifier is uniquely corresponding to one beam identifier and one cell identity. The corresponding beam identifier and the corresponding cell identity may be obtained according to the specified identifier.

For example, a correspondence between the specified identifier $N_{ID}^{new}$ and each of the beam identifier $N_{beam}^{ID}$ and the cell identity $N_{ID}^{cell}$ may be shown in the following Table 1. $N_{sumbeam}$ represents a total beam quantity, and $N_{sumcell}$ represents a total cell quantity. The base station may generate a new specified identifier for the beam identifier and the cell identity according to the correspondence. Subsequently, the user equipment may also determine, according to the correspondence, the beam identifier corresponding to the specified identifier.

TABLE 1

| $N_{ID}^{new}$ | $N_{beam}^{ID}$ | $N_{ID}^{cell}$ |
|---|---|---|
| 0 | 0 | 0 |
| 1 | 1 | 0 |
| ... | ... | ... |
| $N_{sumbeam-1}$ | $N_{sumbeam-1}$ | 0 |
| $N_{sumbeam}$ | 0 | 1 |
| $N_{sumbeam+1}$ | 1 | 1 |
| ... | ... | ... |
| $2 \times N_{sumbeam-1}$ | $N_{sumbeam-1}$ | 1 |
| $2 \times N_{sumbeam}$ | 0 | 2 |
| ... | ... | ... |
| $N_{sumcell} \times N_{sumbeam-1}$ | $N_{sumbeam-1}$ | $N_{sumcell-1}$ |

The base station calculates the initialization value according to the specified identifier by using the following formula:

$$c_{init}=2^{10}\cdot(7\cdot(n_s+1)+l+1)\cdot(2\cdot N_{ID}^{new}+1)+2\cdot N_{ID}^{new}+N_{CP},$$
where $c_{init}$ represents the initialization value, $n_s$ represents a timeslot number, l represents an OFDM symbol number, $N_{ID}^{new}$ represents the specified identifier, and $N_{CP}$ represents a CP (Cyclic Prefix, cyclic prefix) length identifier.

Persons skilled in the art may learn that an initialization value of a first M sequence of a scrambling sequence of the CRS is fixed, and an initialization value $c_{init}$ of a second M sequence directly affects a generated scrambling sequence. However, in this embodiment of the present disclosure, after calculating the initialization value, the base station generates a sequence of the CRS according to the initialization value. The sequence of the CRS includes the specified identifier. The specified identifier may be obtained according to the sequence of the CRS, so that the beam identifier can be obtained.

Compared with an existing initialization value $c_{init}=2^{10}\cdot(7\cdot(n_s+1)\cdot(2\cdot N_{ID}^{cell}+1)+2\cdot N_{ID}^{cell}+N_{CP}$, the initialization value in this embodiment of the present disclosure is determined according to the beam identifier $N_{beam}^{ID}$ or determined according to the specified identifier $N_{ID}^{new}$, so that the user equipment can obtain the beam identifier according to the received CRS.

502. The base station sends the CRS by using a beam corresponding to the beam identifier.

503. When receiving the CRS, the user equipment obtains the beam identifier according to the CRS.

In this embodiment of the present disclosure, the user equipment receives the CRS, parses the CRS to obtain the initialization value of the CRS, and obtains the beam identifier according to the initialization value. Specifically, if the initialization value is determined only according to the beam identifier, the user equipment may obtain the beam identifier according to the initialization value. If the initialization value is determined according to the specified identifier generated by using the beam identifier and the cell identity, the user equipment may obtain the specified identifier according to the CRS, and obtain the beam identifier corresponding to the specified identifier.

504. The user equipment sends the beam identifier to the base station.

505. The base station receives the beam identifier, and communicates with the user equipment by using the beam corresponding to the beam identifier.

Steps 502 to 505 are similar to steps 402 to 405, and details are not described herein again.

In this embodiment of the present disclosure, the base station may determine, according to the beam identifier fed back by the user equipment, a beam in which the user equipment is currently located, and send control information and data information to the user equipment in a timely manner by using the beam.

Figure 5B:
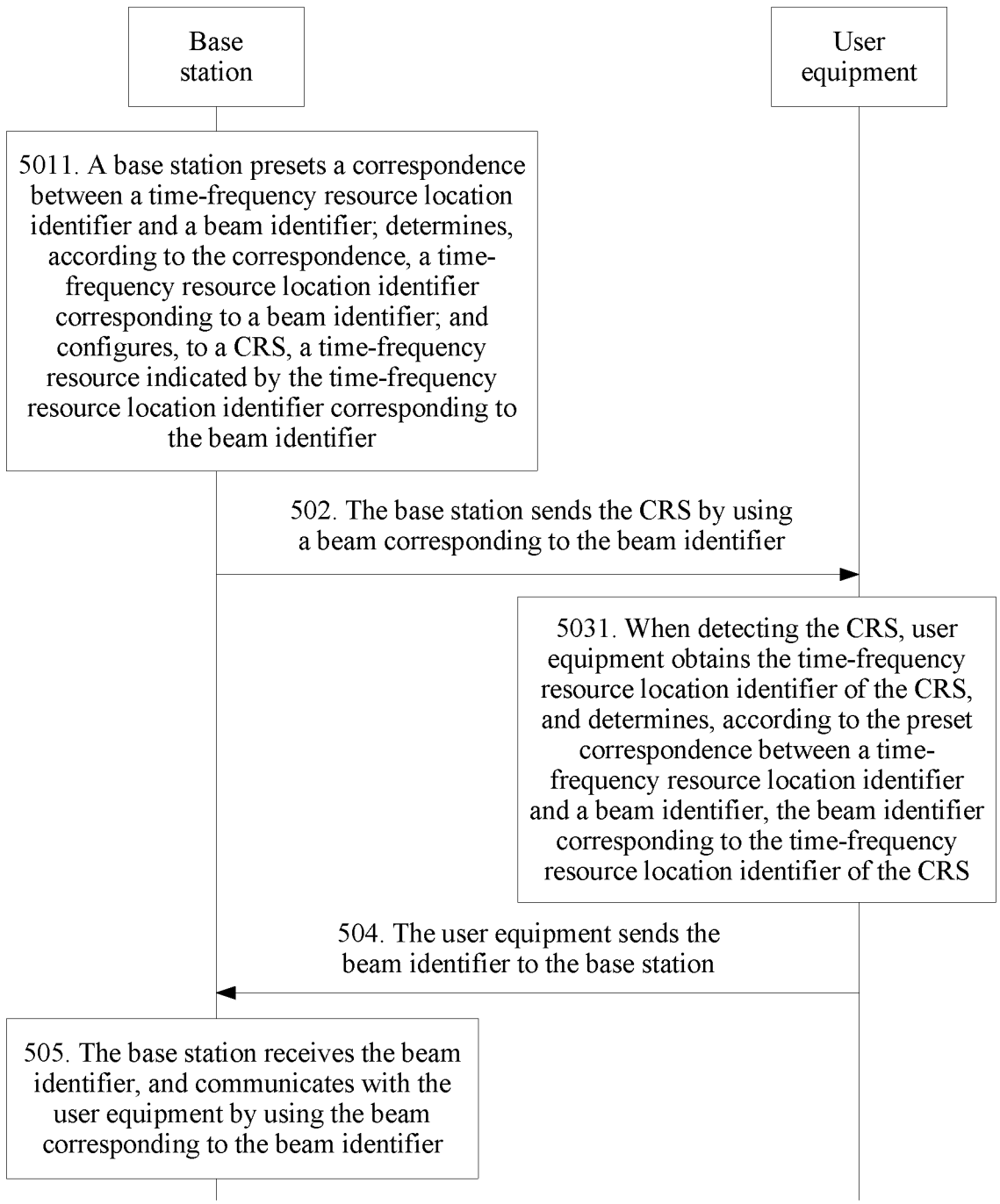
FIG. 5B is a flowchart of another beam identifier obtaining method according to an embodiment of the present disclosure.

It should be noted that, this embodiment of the present disclosure is described by using an example that the base station calculates the initialization value of the CRS according to the beam identifier or the specified identifier. However, in another embodiment provided in this embodiment of the present disclosure, referring to FIG. 5B, step 501 may be replaced with the following step 5011.

5011. The base station presets a correspondence between a time-frequency resource location identifier and a beam identifier; determines, according to the correspondence, a time-frequency resource location identifier corresponding to a beam identifier; and configures, to a CRS, a time-frequency resource indicated by the time-frequency resource location identifier corresponding to the beam identifier.

The time-frequency resource location identifier is used to indicate a time-frequency resource location, and may be a sequence number of the time-frequency resource, another identifier, or the like. No limitation is imposed in this embodiment of the present disclosure. In the correspondence, one beam identifier may be corresponding to one time-frequency resource location identifier, or may be corresponding to multiple time-frequency resource location identifiers. No limitation is imposed in this embodiment of the present disclosure.

In a subsequent process, the base station sends the CRS by using a beam corresponding to the beam identifier. Step 503 may be replaced with the following step 5031.

5031. When detecting the CRS, the user equipment obtains the time-frequency resource location identifier of the CRS, and determines, according to the preset correspondence between a time-frequency resource location identifier and a beam identifier, the beam identifier corresponding to the time-frequency resource location identifier of the CRS.

In a subsequent process, the user equipment sends the beam identifier to the base station. The base station receives the beam identifier, and communicates with the user equipment by using the beam corresponding to the beam identifier.

Further, in the correspondence between a time-frequency resource location identifier and a beam identifier, a beam identifier corresponding to each time-frequency resource location identifier may be obtained by performing modulo operation on the corresponding time-frequency resource location identifier and a total beam quantity. After the base station determines the beam identifier, the time-frequency resource location identifier corresponding to the beam identifier may be determined by calculating a quotient of the beam identifier by the total beam quantity. When the total beam quantity is greater than 1, in the correspondence, one beam identifier is corresponding to multiple time-frequency resource location identifiers.

For example, the total beam quantity is 4, beam identifiers are respectively 0 to 3, a quantity of time-frequency resource locations is 16, time-frequency resource location identifiers are 0 to 15, and the correspondence between a time-frequency resource location identifier and a beam identifier may be shown in the following Table 2. The time-frequency resource location identifiers 0 to 15 are grouped into four groups according to the total beam quantity 4. Each group includes four time-frequency resource location identifiers. A beam identifier 5 is used as an example. A quotient of the beam identifier 5 by the total beam quantity 4 is 1, and the beam identifier 5 is corresponding to time-frequency resource location identifiers 4 to 7 in the second group.

TABLE 2

| Beam identifier | Time-frequency resource location identifier |
|---|---|
| 0 | 0 |
|   | 1 |
|   | 2 |
|   | 3 |
| 1 | 4 |
|   | 5 |
|   | 6 |
|   | 7 |
| 2 | 8 |
|   | 9 |
|   | 10 |
|   | 11 |
| 3 | 12 |
|   | 13 |

TABLE 2-continued

| Beam identifier | Time-frequency resource location identifier |
|---|---|
|   | 14 |
|   | 15 |

Correspondingly, after determining the beam identifier, the base station obtains, according to the correspondence, multiple time-frequency resource location identifiers corresponding to the beam identifier; selects one idle time-frequency resource from multiple time-frequency resources indicated by the multiple time-frequency resource location identifiers; configures the idle time-frequency resource to the CRS; and sends the CRS at a location of the selected time-frequency resource by using the beam corresponding to the beam identifier, so that the user equipment detecting the CRS obtains a time-frequency resource location identifier of the CRS, and performs modulo operation on the time-frequency resource location identifier and the total beam quantity, so as to obtain the beam identifier. Specifically, the user equipment determines the beam identifier of the CRS according to the time-frequency resource location identifier of the CRS and the total beam quantity by using the following formula:

$N_{beam}^{ID}$=CRSconfigureID mod $N_{sumbeam}$, where $N_{beam}^{ID}$ represents the beam identifier, CRSconfigureID represents the time-frequency resource location identifier of the CRS, and $N_{sumbeam}$ represents the total beam quantity.

For different CRSs, because time-frequency resource configuration locations of the CRSs are different, beam identifiers corresponding to the CRSs are different. The user equipment detecting the CRS obtains the time-frequency resource location identifier of the CRS, and can obtain the beam identifier by performing modulo operation on the time-frequency resource location identifier and the total beam quantity.

The time-frequency resource location identifier of the CRS and the beam identifier are bound by performing modulo operation, so that the user equipment detecting the CRS can obtain the beam identifier according to a time-frequency resource location of the CRS, so as to determine a beam in which the user equipment is currently located.

It should be noted that, the base station may perform either step 501 or step 5011, and a specific step to be performed may be determined by the base station by negotiating with the user equipment in advance. Further, the base station may perform steps 501 and 5011, so that the user equipment can obtain the beam identifier by descrambling the detected CRS, and may obtain the beam identifier according to the time-frequency resource location identifier of the detected CRS. A step in steps 501 and 5011 that is performed by the base station is not limited in this embodiment of the present disclosure.

In addition, step 5011 may be applied to a secondary synchronization signal scenario in the previous embodiment. A specific implementation process is similar to a CRS signal implementation process, and details are not described herein again.

According to the method provided in this embodiment of the present disclosure, a base station calculates an initialization value of a CRS according to a beam identifier, so as to obtain the CRS corresponding to the beam identifier, and sends the CRS by using a beam corresponding to the beam identifier, so that user equipment receiving the CRS can obtain the beam identifier, and feed back the beam identifier to the base station. Alternatively, a base station determines, according to a preset correspondence between a time-frequency resource location identifier and a beam identifier, a time-frequency resource location identifier corresponding to a beam identifier; and configures, to a CRS, a time-frequency resource indicated by the time-frequency resource location identifier corresponding to the beam identifier, so that user equipment detecting the CRS can determine the beam identifier according to the time-frequency resource location identifier of the CRS, and feedback the beam identifier to the base station. Therefore, the base station can determine, according to the beam identifier, a beam in which the user equipment is currently located, communicate with the user equipment by using the beam in which the user equipment is currently located, and does not need to communicate with the user equipment by using multiple beams, thereby increasing a throughput and improving resource utilization.

In a next embodiment, a beam identifier obtaining method provided in this embodiment of the present disclosure is described by using an example that a signal corresponding to a beam identifier is a CSI-RS (channel-state information reference signal). For ease of description, before this embodiment of the present disclosure is described in detail, the CSI-RS is first described as follows:

In an existing communications system, a CSI-RS is used to help user equipment to obtain channel state information.

A sequence $r_{l,n_s}(m)$ of the CSI-RS is defined as follows:

$$r_{l,n_s}(m) = \frac{1}{\sqrt{2}}(1 - 2 \cdot c(2m)) + j\frac{1}{\sqrt{2}}(1 - 2 \cdot c(2m+1)),$$
$$m = 0, 1, \ldots, N_{RB}^{max,DL} - 1,$$

where $n_s$ is a timeslot number within a radio frame, l is an OFDM symbol number within a timeslot, c(i) is a pseudo-random sequence, and an initialization value of c(i) is:

$$c_{init}=2^{10} \cdot (7 \cdot (n_s+1)+l+1) \cdot (2 \cdot N_{ID}^{CSI}+1)+2 \cdot N_{ID}^{CSI}+N_{CP},$$

where $$N_{CP} = \begin{cases} 1 & \text{for a normal } CP \\ 0 & \text{for an extended } CP \end{cases},$$

and $N_{ID}^{CSI}$ is equal to $N_{ID}^{cell}$.

Figure 6A:
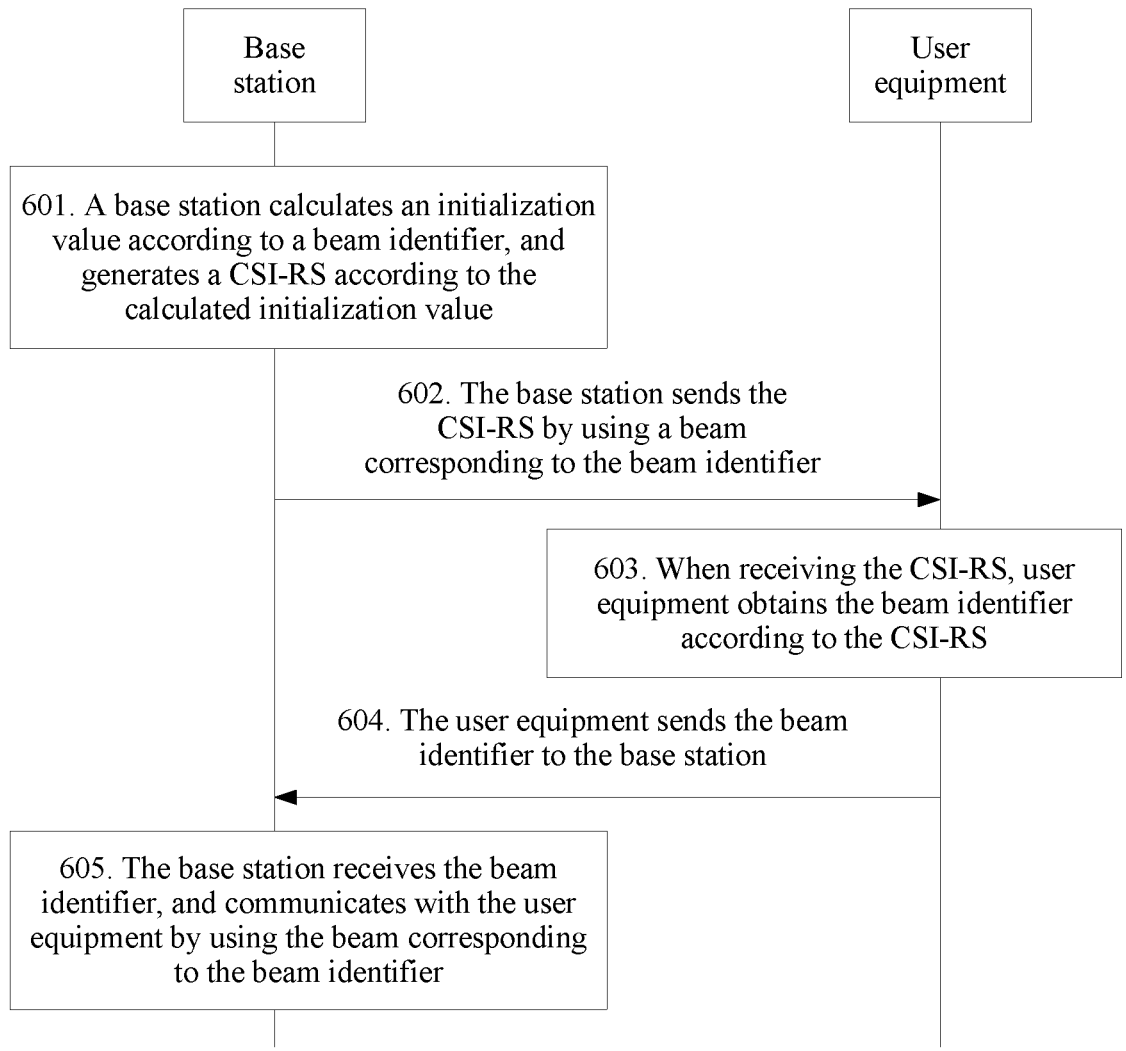
FIG. 6A is a flowchart of a beam identifier obtaining method according to an embodiment of the present disclosure.

FIG. 6A is a flowchart of a beam identifier obtaining method according to an embodiment of the present disclosure. Referring to FIG. 6A, interaction entities in this embodiment of the present disclosure are a base station and user equipment. The method includes the following steps.

601. The base station calculates an initialization value according to a beam identifier, and generates a CSI-RS according to the calculated initialization value.

Step 601 is similar to step 501, and details are not described herein again.

602. The base station sends the CSI-RS by using a beam corresponding to the beam identifier.

603. When receiving the CSI-RS, the user equipment obtains the beam identifier according to the CSI-RS.

604. The user equipment sends the beam identifier to the base station.

605. The base station receives the beam identifier, and communicates with the user equipment by using the beam corresponding to the beam identifier.

Figure 6B:
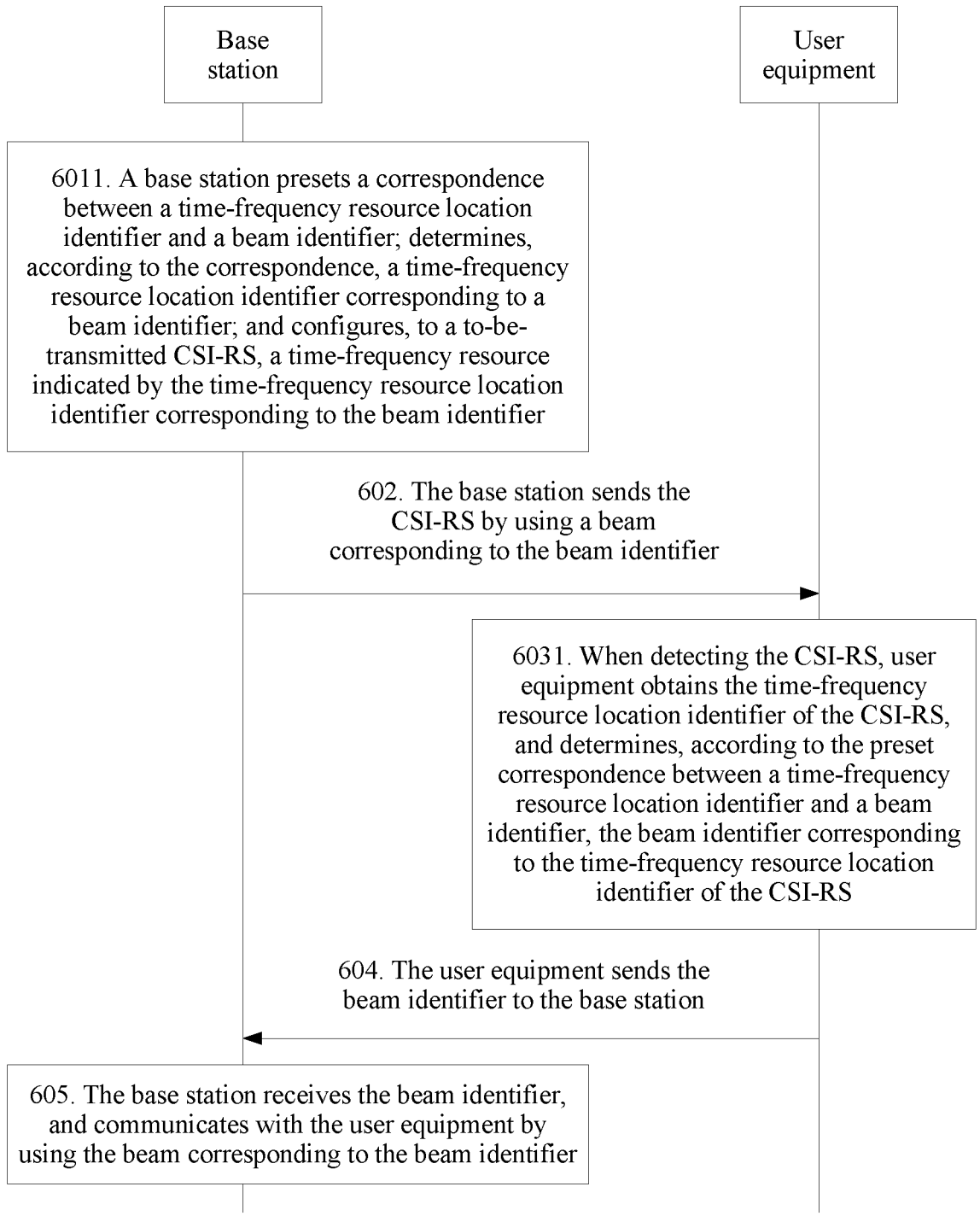
FIG. 6B is a flowchart of another beam identifier obtaining method according to an embodiment of the present disclosure.

In another embodiment provided in this embodiment of the present disclosure, referring to FIG. 6B, step 601 may be replaced with the following step 6011.

6011. The base station presets a correspondence between a time-frequency resource location identifier and a beam identifier; determines, according to the correspondence, a time-frequency resource location identifier corresponding to a beam identifier; and configures, to a CSI-RS, a time-frequency resource indicated by the time-frequency resource location identifier corresponding to the beam identifier.

In the correspondence, one beam identifier may be corresponding to one time-frequency resource location identifier, or may be corresponding to multiple time-frequency resource location identifiers. No limitation is imposed in this embodiment of the present disclosure.

In a subsequent process, the base station sends the CSI-RS by using a beam corresponding to the beam identifier. Step 603 may be replaced with the following step 6031.

6031. When detecting the CSI-RS, the user equipment obtains the time-frequency resource location identifier of the CSI-RS, and determines, according to the preset correspondence between a time-frequency resource location identifier and a beam identifier, the beam identifier corresponding to the time-frequency resource location identifier of the CSI-RS.

In a subsequent process, the user equipment sends the beam identifier to the base station. The base station receives the beam identifier, and communicates with the user equipment by using the beam corresponding to the beam identifier.

Further, in the correspondence between a time-frequency resource location identifier and a beam identifier, a beam identifier corresponding to each time-frequency resource location identifier may be obtained by performing modulo operation on the corresponding time-frequency resource location identifier and a total beam quantity. After the base station determines the beam identifier, the time-frequency resource location identifier corresponding to the beam identifier may be determined by calculating a quotient of the beam identifier by the total beam quantity. When the total beam quantity is greater than 1, in the correspondence, one beam identifier is corresponding to multiple time-frequency resource location identifiers.

After determining the beam identifier, the base station obtains, according to the correspondence, multiple time-frequency resource location identifiers corresponding to the beam identifier; selects one idle time-frequency resource from multiple time-frequency resources indicated by the multiple time-frequency resource location identifiers; configures the idle time-frequency resource to the CSI-RS; and sends the CSI-RS at a location of the selected time-frequency resource by using the beam corresponding to the beam identifier, so that the user equipment detecting the CSI-RS obtains a time-frequency resource location identifier of the CSI-RS, and performs modulo operation on the time-frequency resource location identifier and the total beam quantity, so as to obtain the beam identifier. Specifically, the user equipment determines the beam identifier of the CSI-RS according to the total beam quantity and the time-frequency resource location identifier of the CSI-RS by using the following formula:

$N_{beam}^{ID}$=CSI–RSconfigureID mod $N_{sumbeam}$, where $N_{beam}^{ID}$ represents the beam identifier, CSI–RSconfigureID represents the time-frequency resource location identifier of the CSI-RS, and $N_{sumbeam}$ represents the total beam quantity.

In a subsequent process, the base station sends the CSI-RS by using the beam corresponding to the beam identifier, so that the user equipment detecting the CSI-RS obtains the time-frequency resource location identifier of the CSI-RS, and performs modulo operation on the time-frequency resource location identifier and the total beam quantity, so as to obtain the beam identifier.

According to the method provided in this embodiment of the present disclosure, abase station calculates an initialization value of a CSI-RS according to a beam identifier, so as to obtain the CSI-RS corresponding to the beam identifier, and sends the CSI-RS by using a beam corresponding to the beam identifier, so that user equipment receiving the CSI-RS can obtain the beam identifier, and feed back the beam identifier to the base station. Alternatively, a base station determines, according to a preset correspondence between a time-frequency resource location identifier and a beam identifier, a time-frequency resource location identifier corresponding to abeam identifier; and configures, to a CSI-RS, a time-frequency resource indicated by the time-frequency resource location identifier corresponding to the beam identifier, so that user equipment detecting the CSI-RS can determine the beam identifier according to the time-frequency resource location identifier of the CSI-RS, and feed back the beam identifier to the base station. Therefore, the base station can determine, according to the beam identifier, a beam in which the user equipment is currently located, communicate with the user equipment by using the beam in which the user equipment is currently located, and does not need to communicate with the user equipment by using multiple beams, thereby increasing a throughput and improving resource utilization.

Figure 7:
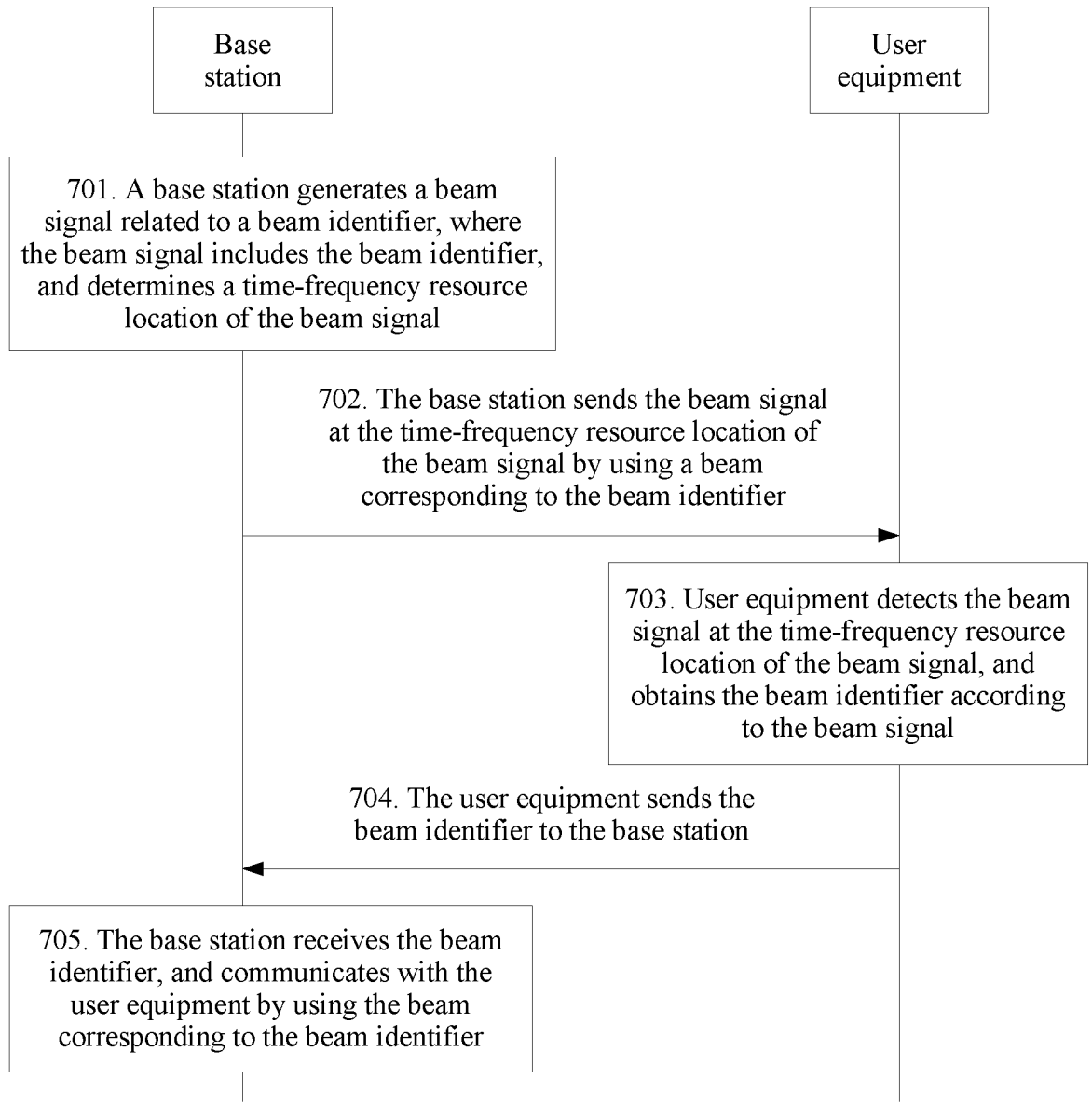
FIG. 7 is a flowchart of a beam identifier obtaining method according to an embodiment of the present disclosure.

FIG. 7 is a flowchart of a beam identifier obtaining method according to an embodiment of the present disclosure. Referring to FIG. 7, interaction entities in this embodiment of the present disclosure are abase station and user equipment. The method includes the following steps.

701. The base station generates a beam signal corresponding to a beam identifier, where the beam signal includes the beam identifier, and determines a time-frequency resource location of the beam signal.

702. The base station sends the beam signal at the time-frequency resource location of the beam signal by using a beam corresponding to the beam identifier.

703. The user equipment detects the beam signal at the time-frequency resource location of the beam signal, and obtains the beam identifier according to the beam signal.

In this embodiment of the present disclosure, the base station may determine the time-frequency resource location of the beam signal in different manners, and the user equipment detects the beam signal in different manners.

Specifically, steps 701 to 703 may include the following step (1):

(1) The base station determines the time-frequency resource location of the beam signal. There is a preset spacing between the time-frequency resource location of the beam signal and a time-frequency resource location of a third signal. The base station sends the beam signal at the time-frequency resource location of the beam signal by using the beam corresponding to the beam identifier. When obtaining the time-frequency resource location of the third signal, the user equipment detects, at a location between which and the time-frequency resource location of the third signal there is the preset spacing, the beam signal corresponding to the beam identifier of the beam.

The third signal may be a signal that is to be sent by the base station to the user equipment, and may be a secondary synchronization signal, a CRS, a CSI-RS, or another signal. No limitation is imposed in this embodiment of the present disclosure. The preset spacing may be determined by the base station in advance, and notified to each user equipment, or may be determined by the base station by negotiating with each user equipment. No limitation is imposed in this embodiment of the present disclosure.

The base station determines the time-frequency resource location of the third signal, and configures, to the beam signal, a time-frequency resource location at the location between which and the time-frequency resource location of the third signal there is the preset spacing, so as to subsequently send the beam signal at the time-frequency resource location configured to the beam signal. After obtaining the time-frequency resource location of the third signal, the user equipment may detect the beam signal at the location between which and the time-frequency resource location of the third signal there is the preset spacing, that is, at the time-frequency resource location of the beam signal, and obtain the beam identifier included in the beam signal.

The preset spacing is used to indicate a relative location relationship between the time-frequency resource location of the third signal and the time-frequency resource location of the beam signal. The preset spacing may be one unit of spacing on the left, and the time-frequency resource location of the beam signal is located on the left of the time-frequency resource location of the third signal. Alternatively, the preset spacing may be two units of spacings on the right or the like. No limitation is imposed in this embodiment of the present disclosure.

Figure 8:
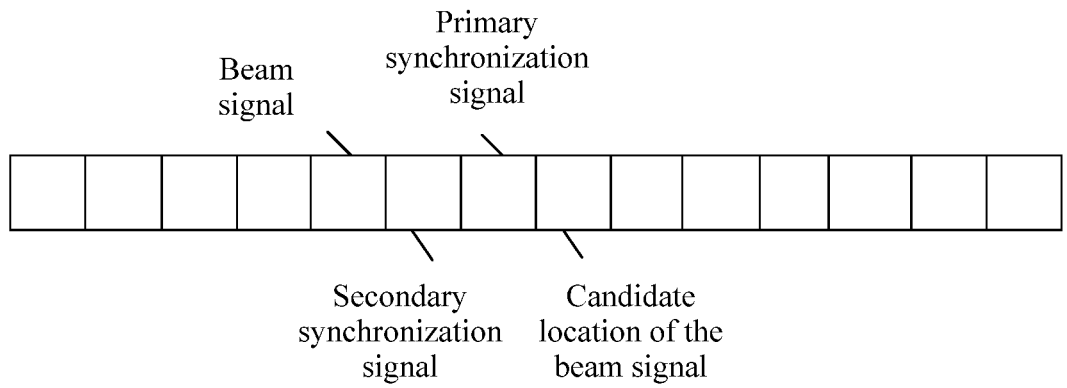
FIG. 8 is a schematic diagram of a time-frequency resource location according to an embodiment of the present disclosure.

Referring to FIG. 8, a secondary synchronization signal is used as an example. The preset spacing may be one unit of spacing on the left. The time-frequency resource location of the beam signal is located on the left of a time-frequency resource location of the secondary synchronization signal. The base station may use the first location on the right of a time-frequency resource location of a primary synchronization signal as a candidate time-frequency resource location of the beam signal, and also send the beam signal at the candidate time-frequency resource location. In a subsequent process, when detecting no beam signal on the left of the time-frequency resource location of the secondary synchronization signal, the user equipment may perform detection at the candidate time-frequency resource location.

In addition, steps 701 to 703 may include the following step (2):

(2) The base station determines the time-frequency resource location of the beam signal as a preset time-frequency resource location, and sends the beam signal at the preset time-frequency resource location by using the beam corresponding to the beam identifier. The user equipment detects the beam signal at the preset time-frequency resource location.

The base station determines the preset time-frequency resource location in advance, and determines the time-frequency resource location of the beam signal as the preset time-frequency resource location, that is, configures, to the beam signal, a time-frequency resource indicated by the preset time-frequency resource location. The base station sends the beam signal at the preset time-frequency resource location by using the beam corresponding to the beam identifier, so that the user equipment detects the beam signal at the preset time-frequency resource location, and obtains the beam identifier included in the beam signal.

The preset time-frequency resource location may be determined by the base station by negotiating with the user equipment. No limitation is imposed in this embodiment of the present disclosure.

In addition, to help the user equipment to detect the beam signal, after step 702, the method may include step (3):

(3) The base station determines a time-frequency resource location identifier of the beam signal, and sends time-frequency resource information to the user equipment. The time-frequency resource information includes the time-frequency resource location identifier. The user equipment receives the time-frequency resource information, and detects, according to the time-frequency resource location identifier included in the time-frequency resource information, the beam signal at the time-frequency resource location in the signal sent by the base station by using the beam.

The time-frequency resource information is used to notify the user equipment of the time-frequency resource location of the beam signal. After sending the beam signal, the base station sends dedicated time-frequency resource information to the user equipment to notify the user equipment. The user equipment may detect, according to the time-frequency resource location identifier included in the time-frequency resource information, the beam signal at the time-frequency resource location indicated by the time-frequency resource location identifier.

Further, the base station may determine the time-frequency resource location of the beam signal as a preset time-frequency resource location. For different user equipments, a beam signal received by each user equipment is located at a preset time-frequency resource location in the signal received by each user equipment. The base station may send, to each user equipment, time-frequency resource information including a preset time-frequency resource location identifier. For any user equipment, when receiving the time-frequency resource information, the user equipment obtains the preset time-frequency resource location identifier included in the time-frequency resource information, and detects the beam signal according to the preset time-frequency resource location identifier at the preset time-frequency resource location in the signal sent by the base station to the user equipment by using the beam.

It should be noted that, the base station may notify the user equipment of the time-frequency resource location of the beam signal in any one or more of the three manners. A specific manner used by the base station is not limited in this embodiment of the present disclosure.

704. The user equipment sends the beam identifier to the base station.

705. The base station receives the beam identifier, and communicates with the user equipment by using the beam corresponding to the beam identifier.

Steps 704 and 705 are similar to steps 404 and 405, and details are not described herein again.

According to the method provided in this embodiment of the present disclosure, a base station generates a beam signal corresponding to a beam identifier; determines a time-frequency resource location of the beam signal; and sends the beam signal at the time-frequency resource location of the beam signal by using a beam corresponding to the beam identifier, so that user equipment can detect the beam signal at the time-frequency resource location of the beam signal, obtain the beam identifier according to the beam signal, and feed back the beam identifier to the base station. Therefore, the base station can determine, according to the beam identifier, a beam in which the user equipment is currently located, communicate with the user equipment by using the beam in which the user equipment is currently located, and does not need to communicate with the user equipment by using multiple beams, thereby increasing a throughput and improving resource utilization.

Figure 9:
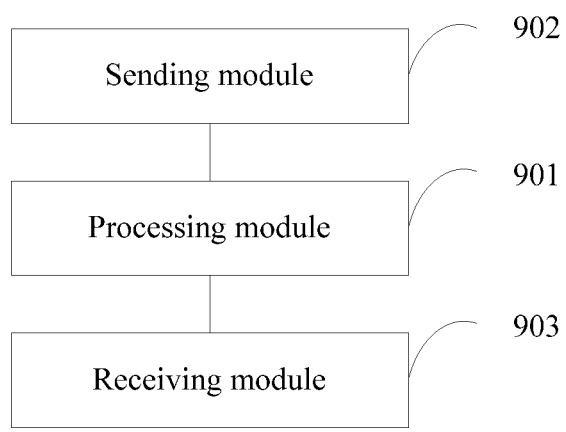
FIG. 9 is a schematic structural diagram of a beam identifier obtaining apparatus according to an embodiment of the present disclosure.

FIG. 9 is a schematic structural diagram of a beam identifier obtaining apparatus according to an embodiment of the present disclosure. Referring to FIG. 9, the apparatus includes:

a processing module 901, configured to determine a signal corresponding to a beam identifier;

a sending module 902, configured to send the signal by using a beam corresponding to the beam identifier, so that user equipment detecting the signal obtains the beam identifier according to the signal; and a receiving module 903, configured to receive the beam identifier fed back by the user equipment.

The processing module 901 is further configured to communicate with the user equipment by using the beam corresponding to the beam identifier.

The apparatus provided in this embodiment of the present disclosure determines a signal corresponding to a beam identifier, and sends the signal by using a beam corresponding to the beam identifier, so that user equipment detecting the signal can obtain the beam identifier. Therefore, the apparatus can determine a beam in which the user equipment is currently located, and further communicate with the user equipment by using the beam.

Optionally, the processing module 901 is further configured to scramble a first signal according to the beam identifier, so as to obtain a second signal.

Optionally, the processing module 901 is further configured to: when the first signal is a secondary synchronization signal, generate a scrambling sequence according to the beam identifier, or generate a scrambling sequence according to the beam identifier and a total beam quantity; and scramble the first signal according to the generated scrambling sequence, so as to obtain the second signal.

Optionally, the processing module 901 is further configured to generate the scrambling sequence according to the beam identifier by using the following formula:

$b_0(n) = \tilde{b}((n+N_{beam}^{ID}) \bmod 31)$, where $b_0(n)$ represents the scrambling sequence, $N_{beam}^{ID}$ represents the beam identifier, $\tilde{b}(i) = 1 - 2x_1(i)$, $0 \le i \le 30$, $x_1(\tilde{i}+5) = (a \cdot x_1(\tilde{i}+4) + b \cdot x_1(\tilde{i}+3) + c \cdot x_1(\tilde{i}+2) + d \cdot x_1(\tilde{i}+1) + e \cdot x_1(\tilde{i})) \bmod 2$, $0 \le \tilde{i} \le 25$, and a value of each of a, b, c, d, and e is 0 or 1.

Optionally, the processing module 901 is further configured to scramble the first signal according to the generated scrambling sequence by using the following formulas, so as to obtain the second signal:

$$d(2n) = \begin{cases} s_0^{(m_0)}(n)c_0(n)b_0(n) & \text{in a subframe m} \\ s_1^{(m_1)}(n)c_0(n)b_0(n) & \text{in a subframe n} \end{cases}$$

$$d(2n+1) = \begin{cases} s_1^{(m_1)}(n)c_1(n)b_0(n)z_1^{(m_0)}(n) & \text{in a subframe m} \\ s_0^{(m_0)}(n)c_1(n)b_0(n)z_1^{(m_1)}(n) & \text{in a subframe n} \end{cases}$$

where)

$b_0(n)$ represents the scrambling sequence, $0 \le n \le 30$, $d(2n)$ and $d(2n+1)$ represent sequences of the second signal, and the subframe m and the subframe n represent subframes in which the secondary synchronization signal is located;

$s_0^{(m_0)}(n) = \tilde{s}((n+m_0) \bmod 31)$ $s_1^{(m_1)}(n) = \tilde{s}((n+m_1) \bmod 31)$, $\tilde{s}(j)=1-2x_2(j)$, $x_2(\bar{j}+5)=(x_2(\bar{j}+2)+x_2(\bar{j}))\mod 2$, $0\leq j\leq 30$, $0\leq \bar{j}\leq 25$, and $x_2(0)=0$, $x_2(1)=0$, $x_2(2)=0$, $x_2(3)=0$, and $x_2(4)=1$;

$$c_0(n)=\tilde{c}((n+N_{ID}^{(2)})\mod 31)$$

$$c_1(n)=\tilde{c}((n+N_{ID}^{(2)}+3)\mod 31),$$

$N_{ID}^{(2)}$ represents a cell identity, $N_{ID}^{(2)} \in \{0,1,2\}$, $\tilde{c}(k)=1-2x_3(k)$, $0\leq k\leq 30$, $x_3(\bar{k}+5)=(x_3(\bar{k}+3)+x_3(\bar{k}))\mod 2$, $0\leq \bar{k}\leq 25$, and $x_3(0)=0$, $x_3(1)=0$, $x_3(2)=0$, $x_3(3)=0$, and $x_3(4)=1$; and $$z_0^{(m_0)}(n)=\tilde{z}((n+(m_0 \mod 8))\mod 31)$$

$$z_1^{(m_1)}(n)=\tilde{z}((n+(m_1 \mod 8))\mod 31),$$

$\tilde{z}(r)=1-2x_4(r)$, $0\leq r\leq 30$, $x_4(\bar{r}+5)=(x_4(\bar{r}+4)+x_4(\bar{r}+2)+x_4(\bar{r}+1)+x_4(\bar{r}))\mod 2$, $0\leq \bar{r}\leq 25$, and $x_4(0)=0$, $x_4(1)=0$, $x_4(2)=0$, $x_4(3)=0$, and $x_4(4)=1$.

Optionally, the processing module 901 is further configured to generate scrambling sequences according to the beam identifier and the total beam quantity by using the following formulas:

$$b_0(n)=\tilde{b}((n+N_{beam}^{ID})\mod 31)$$

$$b_1(n)=\tilde{b}((n+N_{beam}^{ID}+N_{sumbeam})\mod 31), \text{ where}$$

$b_0(n)$ and $b_1(n)$ represents the scrambling sequences, $N_{beam}^{ID}$ represents the beam identifier, $N_{sumbeam}$ represents the total beam quantity, $N_{beam}^{ID}=0,1,\ldots,N_{sumbeam}-1$, $\tilde{b}(i)=1-2x_1(i)$, and $0\leq i\leq 30$; and $x_1(\bar{i}+5)=(a\cdot x_1(\bar{i}+4)+b\cdot x_1(\bar{i}+3)+c\cdot x_1(\bar{i}+2)+d\cdot x_1(\bar{i}+1)+e\cdot x_1(\bar{i}))\mod 2$, $0\leq \bar{i}\leq 25$, and a value of each of a, b, c, d, and e is 0 or 1.

Optionally, the processing module 901 is further configured to scramble the first signal according to the generated scrambling sequence by using the following formulas, so as to obtain the second signal:

$$d(2n) = \begin{cases} s_0^{(m_0)}(n)c_0(n)b_0(n) & \text{in a subframe m} \\ s_1^{(m_1)}(n)c_0(n)b_0(n) & \text{in a subframe n} \end{cases}$$

$$d(2n+1) = \begin{cases} s_1^{(m_1)}(n)c_1(n)b_1(n)z_1^{(m_0)}(n) & \text{in a subframe m} \\ s_0^{(m_0)}(n)c_1(n)b_1(n)z_1^{(m_1)}(n) & \text{in a subframe n} \end{cases},$$

where $b_0(n)$ and $b_1(n)$ represent the scrambling sequences, $0\leq n\leq 30$, $d(2n)$ and $d(2n+1)$ represent sequences of the second signal, and the subframe m and the subframe n represent subframes in which the secondary synchronization signal is located;

$$s_0^{(m_0)}(n)=\tilde{s}((n+m_0)\mod 31)$$

$$s_1^{(m_1)}(n)=\tilde{s}((n+m_1)\mod 31),$$

$\tilde{s}(j)=1-2x_2(j)$, $x_2(\bar{j}+5)=(x_2(\bar{j}+2)+x_2(\bar{j}))\mod 2$, $0\leq j\leq 30$, $0\leq \bar{j}\leq 25$, and $x_2(0)=0$, $x_2(1)=0$, $x_2(2)=0$, $x_2(3)=0$, and $x_2(4)=1$;

$$c_0(n)=\tilde{c}((n+N_{ID}^{(2)})\mod 31)$$

$$c_1(n)=\tilde{c}((n+N_{ID}^{(2)}+3)\mod 31),$$

$N_{ID}^{(2)}$ represents a cell identity, $N_{ID}^{(2)} \in \{0,1,2\}$, $\tilde{c}(k)=1-2x_3(k)$, $0\leq k\leq 30$, $x_3(\bar{k}+5)=(x_3(\bar{k}+3)+x_3(\bar{k}))\mod 2$, $0\leq \bar{k}\leq 25$, and $x_3(0)=0$, $x_3(1)=0$, $x_3(2)=0$, $x_3(3)=0$, and $x_3(4)=1$; and $$z_0^{(m_0)}(n)=\tilde{z}((n+(m_0 \mod 8))\mod 31)$$

$$z_1^{(m_1)}(n)=\tilde{z}((n+(m_1 \mod 8))\mod 31),$$

$\tilde{z}(r)=1-2x_4(r)$, $0\leq r\leq 30$, $x_4(\bar{r}+5)=(x_4(\bar{r}+4)+x_4(\bar{r}+2)+x_4(\bar{r}+1)+x_4(\bar{r}))\mod 2$, $0\leq \bar{r}\leq 25$, and $x_4(0)=0$, $x_4(1)=0$, $x_4(2)=0$, $x_4(3)=0$, and $x_4(4)=1$.

Optionally, the processing module 901 is further configured to: calculate an initialization value according to the beam identifier, or calculate an initialization value according to the beam identifier and a cell identity; and generate a reference signal according to the calculated initialization value.

Optionally, the reference signal is a cell-specific reference signal CRS or a channel state information-reference signal CSI-RS.

Optionally, the processing module 901 is further configured to calculate the initialization value according to the beam identifier by using the following formula:

$$c_{init}=2^{10}\cdot(7\cdot(n_s+1)l+1)\cdot(2\cdot N_{beam}^{ID}+1)+2\cdot N_{beam}^{ID}+N_{CP},$$

where $c_{init}$ represents the initialization value, $n_s$ represents a timeslot number, l represents an orthogonal frequency division multiplexing OFDM symbol number, $N_{beam}^{ID}$ represents the beam identifier, and $N_{CP}$ represents a cyclic prefix CP length identifier.

Optionally, the processing module 901 is further configured to: generate a specified identifier according to the beam identifier and the cell identity; and calculate the initialization value according to the specified identifier by using the following formula:

$$c_{init}=2^{10}\cdot(7\cdot(n_s+1)l+1)\cdot(2\cdot N_{ID}^{new}+1)+2\cdot N_{ID}^{new}+N_{CP},$$

where $c_{init}$ represents the initialization value, $n_s$ represents a timeslot number, l represents an orthogonal frequency division multiplexing OFDM symbol number, $N_{ID}^{new}$ represents the specified identifier, and $N_{CP}$ represents a cyclic prefix CP length identifier.

Optionally, the processing module 901 is further configured to: generate a specified identifier according to the beam identifier and the cell identity; and calculate the initialization value according to the specified identifier by using the following formula:

$$c_{init}=2^{10}\cdot(7\cdot(n_s+1)l+1)\cdot(2\cdot N_{ID}^{new}+1)+2\cdot N_{ID}^{new}+N_{CP},$$

where $c_{init}$ represents the initialization value, $n_s$ represents a timeslot number, l represents an orthogonal frequency division multiplexing OFDM symbol number, $N_{ID}^{new}$ represents the specified identifier, and $N_{CP}$ represents a cyclic prefix CP length identifier.

Optionally, the processing module 901 is configured to generate a beam signal corresponding to the beam identifier, where the beam signal includes the beam identifier.

The processing module 901 is configured to determine a time-frequency resource location of the beam signal.

The sending module 902 is further configured to send the beam signal at the time-frequency resource location of the beam signal by using the beam corresponding to the beam identifier, so that user equipment detecting the beam signal obtains the beam identifier included in the beam signal.

Optionally, there is a preset spacing between a time-frequency resource location of a third signal and the time-frequency resource location that is of the beam signal and that is determined by the base station.

Optionally, the processing module 901 is further configured to determine the time-frequency resource location of the beam signal as a preset time-frequency resource location.

The sending module 902 is further configured to send the beam signal at the preset time-frequency resource location by using the beam corresponding to the beam identifier, so that the user equipment detects the beam signal at the preset time-frequency resource location, and obtains the beam identifier included in the beam signal.

Optionally, the sending module 902 is further configured to send time-frequency resource information to the user equipment, where the time-frequency resource information includes a time-frequency resource location identifier of the beam signal, so that the user equipment detects the beam signal at the time-frequency resource location according to the time-frequency resource location identifier.

Optionally, the processing module 901 is further configured to: determine, according to a preset correspondence between a time-frequency resource location identifier and a beam identifier, a time-frequency resource location identifier corresponding to the beam identifier; and configure, to the signal, a time-frequency resource indicated by the time-frequency resource location identifier, so that when the signal is sent by using the beam corresponding to the beam identifier, the user equipment detecting the signal obtains the beam identifier according to the time-frequency resource location identifier of the signal and the correspondence.

Optionally, in the correspondence, a beam identifier corresponding to each time-frequency resource location identifier is obtained by performing modulo operation on the corresponding time-frequency resource location identifier and a total beam quantity.

Correspondingly, the processing module 901 configures, to the signal, the time-frequency resource indicated by the time-frequency resource location identifier, so that the user equipment detecting the signal performs modulo operation on the time-frequency resource location identifier of the signal and the total beam quantity, so as to obtain the beam identifier.

Optionally, the processing module 901 is further configured to: if multiple beam identifiers fed back by the user equipment are received, obtain signal strength corresponding to each beam identifier; select one beam identifier from the multiple beam identifiers according to the signal strength corresponding to the multiple beam identifiers; and communicate with the user equipment by using a beam corresponding to the selected beam identifier.

All the optional technical solutions may be combined in any manner to form an optional embodiment of the present disclosure. Details are not further described herein one by one.

Figure 10:
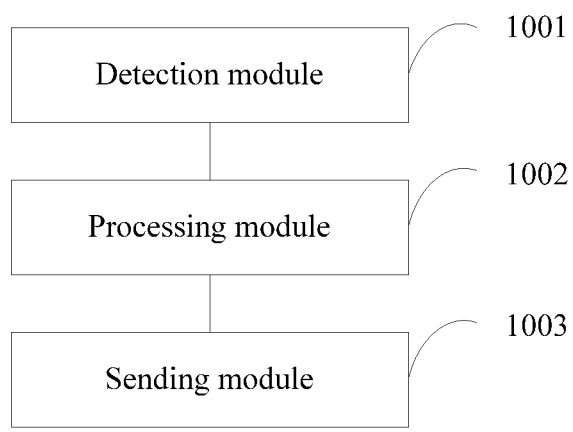
FIG. 10 is a schematic structural diagram of abeam identifier obtaining apparatus according to an embodiment of the present disclosure.

FIG. 10 is a schematic structural diagram of a beam identifier obtaining apparatus according to an embodiment of the present disclosure. Referring to FIG. 10, the apparatus includes:

a detection module 1001, configured to detect a signal sent by a base station by using a beam, where the signal is corresponding to a beam identifier of the beam;

a processing module 1002, configured to obtain the beam identifier according to the signal; and a sending module 1003, configured to send the beam identifier to the base station, so that the base station communicates with the apparatus by using the beam corresponding to the beam identifier.

According to the apparatus provided in this embodiment of the present disclosure, a base station sends, by using a beam, a signal corresponding to a beam identifier, so that when detecting the signal, the apparatus can obtain the beam identifier, and send the beam identifier to the base station. Therefore, the base station can determine, according to the beam identifier, a beam in which the apparatus is currently located, and further communicate with the apparatus by using the beam.

Optionally, the processing module 1002 is further configured to: descramble the signal to obtain a scrambling sequence of the signal, and obtain the beam identifier according to the scrambling sequence, where the signal is obtained by the base station by performing scrambling according to the beam identifier; or the processing module 1002 is further configured to: parse the signal to obtain an initialization value of the signal, and obtain the beam identifier according to the initialization value, where the initialization value is calculated by the base station according to the beam identifier; or the processing module 1002 is further configured to determine, according to a preset correspondence between a time-frequency resource location identifier and a beam identifier, a beam identifier corresponding to a time-frequency resource location identifier of the signal, where a time-frequency resource location of the signal is determined according to the beam identifier and the correspondence; or the processing module 1002 is further configured to: obtain a time-frequency resource location identifier of the signal, and perform modulo operation on the time-frequency resource location identifier and a total beam quantity, so as to obtain the beam identifier.

Optionally, the detection module 1001 is further configured to detect a beam signal sent by the base station by using the beam, where the beam signal includes the beam identifier.

Optionally, the detection module 1001 is further configured to detect the beam signal at a location between which and a time-frequency resource location of a third signal there is a preset spacing, where there is the preset spacing between a time-frequency resource location of the beam signal and the time-frequency resource location of the third signal.

Optionally, the detection module 1001 is further configured to detect the beam signal at a preset time-frequency resource location.

Optionally, the apparatus further includes:

a receiving module, configured to receive time-frequency resource information sent by the base station, where the time-frequency resource information includes a time-frequency resource location identifier of the beam signal.

The detection module 1001 is further configured to detect the beam signal at the time-frequency resource location according to the time-frequency resource location identifier.

Optionally, the processing module 1002 is further configured to: when multiple signals sent by the base station are detected, obtain signal strength of each signal in the multiple signals.

The sending module 1003 is further configured to send the signal strength of each signal and a corresponding beam identifier to the base station, so that the base station selects one beam identifier from multiple received beam identifiers according to signal strength corresponding to the multiple beam identifiers, and communicates with the apparatus by using a beam corresponding to the selected beam identifier; or the sending module 1003 is further configured to successively send, to the base station in descending order of the signal strength of all the signals, a beam identifier corresponding to each signal, so that the base station selects one beam identifier from the multiple beam identifiers according to a receiving order of all the beam identifiers, and communicates with the apparatus by using a beam corresponding to the selected beam identifier; or the processing module 1002 is further configured to select one beam identifier according to signal strength of a signal corresponding to each beam identifier, and the sending module 1003 is further configured to send the selected beam identifier to the base station, so that the base station communicates with the apparatus by using a beam corresponding to the beam identifier.

All the optional technical solutions may be combined in any manner to form an optional embodiment of the present disclosure. Details are not further described herein one by one.

The apparatus in this embodiment of the present disclosure may be configured to perform corresponding steps in the method embodiments provided in the present disclosure. Details are not described one by one again in the present disclosure.

Figure 11:
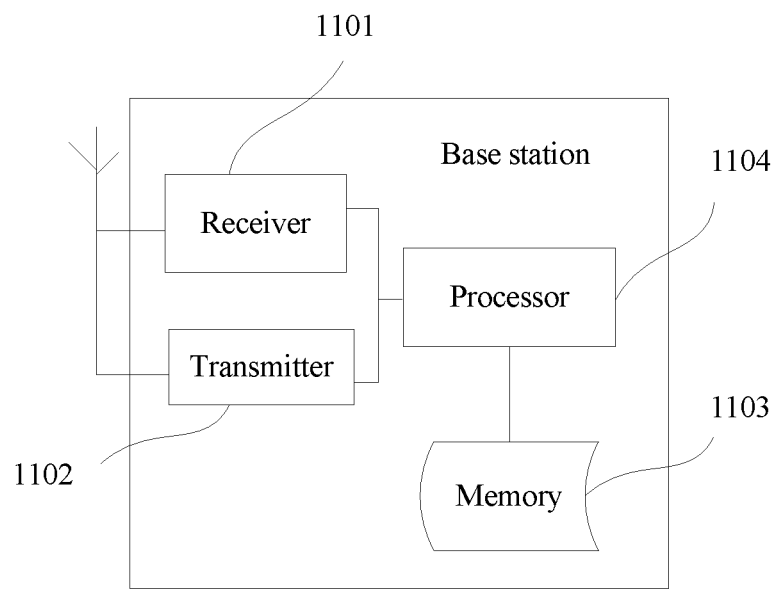
FIG. 11 is a schematic structural diagram of a base station according to an embodiment of the present disclosure.

FIG. 11 is a schematic structural diagram of a base station according to an embodiment of the present disclosure. Referring to FIG. 11, the base station includes a receiver 1101, a transmitter 1102, a memory 1103, and a processor 1104. Each of the receiver 1101, the transmitter 1102, and the memory 1103 is connected to the processor 1104. The memory 1103 stores program code. The processor 1104 is configured to invoke the program code, so as to perform the following operations:

determining a signal corresponding to a beam identifier;

sending the signal by using a beam corresponding to the beam identifier, so that user equipment detecting the signal obtains the beam identifier according to the signal; and when receiving the beam identifier fed back by the user equipment, communicating with the user equipment by using the beam corresponding to the beam identifier.

Optionally, the processor 1104 is further configured to invoke the program code, so as to perform the following operation:

scrambling a first signal according to the beam identifier, so as to obtain a second signal.

Optionally, the processor 1104 is further configured to invoke the program code, so as to perform the following operations:

when the first signal is a secondary synchronization signal, generating a scrambling sequence according to the beam identifier, or generating a scrambling sequence according to the beam identifier and a total beam quantity; and scrambling the first signal according to the generated scrambling sequence, so as to obtain the second signal.

Optionally, the processor 1104 is further configured to invoke the program code, so as to perform the following operation:

generating the scrambling sequence according to the beam identifier by using the following formula:

$$b_0(n) = \tilde{b}((n+N_{beam}^{ID}) \bmod 31), \text{ where}$$

$b_0(n)$ represents the scrambling sequence, $N_{beam}^{ID}$ represents the beam identifier, $\tilde{b}(i) = 1 - 2x_1(i)$, $0 \le i \le 30$, $x_1(\bar{i}+5) = (a \cdot x_1(\bar{i}+4) + b \cdot x_1(\bar{i}+3) + c \cdot x_1(\bar{i}+2) + d \cdot x_1(\bar{i}+1) + e \cdot x_1(\bar{i})) \bmod 2$, $0 \le \bar{i} \le 25$, and a value of each of a, b, c, d, and e is 0 or 1.

Optionally, the processor 1104 is further configured to invoke the program code, so as to perform the following operation:

scrambling the first signal according to the generated scrambling sequence by using the following formulas, so as to obtain the second signal:

$$d(2n) = \begin{cases} s_0^{(m_0)}(n)c_0(n)b_0(n) & \text{in a subframe m} \\ s_1^{(m_1)}(n)c_0(n)b_0(n) & \text{in a subframe n} \end{cases}$$

$$d(2n+1) = \begin{cases} s_1^{(m_1)}(n)c_1(n)b_0(n)z_1^{(m_0)}(n) & \text{in a subframe m} \\ s_0^{(m_0)}(n)c_1(n)b_0(n)z_1^{(m_1)}(n) & \text{in a subframe n} \end{cases},$$

where $b_0(n)$ represents the scrambling sequence, $0 \le n \le 30$, $d(2n)$ and $d(2n+1)$ represent sequences of the second signal, and the subframe m and the subframe n represent subframes in which the secondary synchronization signal is located;

$$s_0^{(m_0)}(n) = \tilde{s}((n+m_0) \bmod 31)$$

$$s_1^{(m_1)}(n) = \tilde{s}((n+m_1) \bmod 31),$$

$\tilde{s}(j) = 1 - 2x_2(j)$, $x_2(\bar{j}+5) = (x_2(\bar{j}+2) + x_2(\bar{j})) \bmod 2$, $0 \le j \le 30$, $0 \le \bar{j} \le 25$, and $x_2(0) = 0$, $x_2(1) = 0$, $x_2(2) = 0$, $x_2(3) = 0$, and $x_2(4) = 1$;

$$c_0(n) = \tilde{c}((n+N_{ID}^{(2)}) \bmod 31)$$

$$c_1(n) = \tilde{c}((n+N_{ID}^{(2)}+3) \bmod 31),$$

$N_{ID}^{(2)}$ represents a cell identity, $N_{ID}^{(2)} \in \{0,1,2\}$, $\tilde{c}(k) = 1 - 2x_3(k)$, $0 \le k \le 30$, $x_3(\bar{k}+5) = (x_3(\bar{k}+3) + x_3(\bar{k})) \bmod 2$, $0 \le \bar{k} \le 25$, and $x_3(0) = 0$, $x_3(1) = 0$, $x_3(2) = 0$, $x_3(3) = 0$, and $x_3(4) = 1$; and $$z_0^{(m_0)}(n) = \tilde{z}((n+(m_0 \bmod 8)) \bmod 31)$$

$$z_1^{(m_1)}(n) = \tilde{z}((n+(m_1 \bmod 8)) \bmod 31),$$

$\tilde{z}(r) = 1 - 2x_4(r)$, $0 \le r \le 30$, $x_4(\bar{r}+5) = (x_4(\bar{r}+4) + x_4(\bar{r}+2) + x_4(\bar{r}+1) + x_4(\bar{r})) \bmod 2$, $0 \le \bar{r} \le 25$, and $x_4(0) = 0$, $x_4(1) = 0$, $x_4(2) = 0$, $x_4(3) = 0$, and $x_4(4) = 1$.

Optionally, the processor 1104 is further configured to invoke the program code, so as to perform the following operation:

generating scrambling sequences according to the beam identifier and the total beam quantity by using the following formulas:

$$b_0(n) = \tilde{b}((n+N_{beam}^{ID}) \bmod 31)$$

$$b_1(n) = \tilde{b}((n+N_{beam}^{ID}+N_{sumbeam}) \bmod 31), \text{ where}$$

$b_0(n)$ and $b_1(n)$ represents the scrambling sequences, $N_{beam}^{ID}$ represents the beam identifier, $N_{sumbeam}$ represents the total beam quantity, $N_{beam}^{ID} = 0, 1, \ldots, N_{sumbeam} - 1$, $\tilde{b}(i) = 1 - 2x_1(i)$, and $0 \le i \le 30$; and $x_1(\bar{i}+5) = (a \cdot x_1(\bar{i}+4) + b \cdot x_1(\bar{i}+3) + c \cdot x_1(\bar{i}+2) + d \cdot x_1(\bar{i}+1) + e \cdot x_1(\bar{i})) \bmod 2$, $0 \le \bar{i} \le 25$, and a value of each of a, b, c, d, and e is 0 or 1.

Optionally, the processor 1104 is further configured to invoke the program code, so as to perform the following operation:

scrambling the first signal according to the generated scrambling sequence by using the following formulas, so as to obtain the second signal:

$$d(2n) = \begin{cases} s_0^{(m_0)}(n)c_0(n)b_0(n) & \text{in a subframe m} \\ s_1^{(m_1)}(n)c_0(n)b_0(n) & \text{in a subframe n} \end{cases}$$

$$d(2n+1) = \begin{cases} s_1^{(m_1)}(n)c_1(n)b_1(n)z_1^{(m_0)}(n) & \text{in a subframe m} \\ s_0^{(m_0)}(n)c_1(n)b_1(n)z_1^{(m_1)}(n) & \text{in a subframe n} \end{cases},$$

where $b_0(n)$ and $b_1(n)$ represent the scrambling sequences, $0 \le n \le 30$, $d(2n)$ and $d(2n+1)$ represent sequences of the second signal, and the subframe m and the subframe n represent subframes in which the secondary synchronization signal is located;

$$s_0^{(m0)}(n) = \tilde{s}((n+m_0) \mod 31)$$

$$s_1^{(m1)}(n) = \tilde{s}((n+m_1) \mod 31),$$

$\tilde{s}(j) = 1 - 2x_2(j)$, $x_2(\bar{j}+5) = (x_2(\bar{j}+2) + x_2(\bar{j})) \mod 2$, $0 \leq j \leq 30$, $0 \leq \bar{j} \leq 25$, and $x_2(0)=0$, $x_2(1)=0$, $x_2(2)=0$, $x_2(3)=0$, and $x_2(4)=1$;

$$c_0(n) = \tilde{c}((n+N_{ID}^{(2)}) \mod 31)$$

$$c_1(n) = \tilde{c}((n+N_{ID}^{(2)}+3) \mod 31),$$

$N_{ID}^{(2)}$ represents a cell identity, $N_{ID}^{(2)} \in \{0,1,2\}$, $\tilde{c}(k) = 1 - 2x_3(k)$, $0 \leq k \leq 30$, $x_3(\bar{k}+5) = (x_3(\bar{k}+3) + x_3(\bar{k})) \mod 2$, $0 \leq \bar{k} \leq 25$, and $x_3(0)=0$, $x_3(1)=0$, $x_3(2)=0$, $x_3(3)=0$, and $x_3(4)=1$; and $$z_0^{(m0)}(n) = \tilde{z}((n+(m_0 \mod 8)) \mod 31)$$

$$z_1^{(m1)}(n) = \tilde{z}((n+(m_1 \mod 8)) \mod 31),$$

$\tilde{z}(r) = 1 - 2x_4(r)$, $0 \leq r \leq 30$, $x_4(\bar{r}+5) = (x_4(\bar{r}+4) + x_4(\bar{r}+2) + x_4(\bar{r}+1) + x_4(\bar{r})) \mod 2$, $0 \leq \bar{r} \leq 25$, and $x_4(0)=0$, $x_4(1)=0$, $x_4(2)=0$, $x_4(3)=0$, and $x_4(4)=1$.

Optionally, the processor 1104 is further configured to invoke the program code, so as to perform the following operations:

calculating an initialization value according to the beam identifier, or calculating an initialization value according to the beam identifier and a cell identity; and generating a reference signal according to the calculated initialization value.

Optionally, the reference signal is a cell-specific reference signal CRS or a channel state information-reference signal CSI-RS.

Optionally, the processor 1104 is further configured to invoke the program code, so as to perform the following operation:

calculating the initialization value according to the beam identifier by using the following formula:

$$c_{init} = 2^{10} \cdot (7 \cdot (n_s+1) + l + 1) \cdot (2 \cdot N_{beam}^{ID} + 1) + 2 \cdot N_{beam}^{ID} + N_{CP}, \text{ where}$$

$c_{init}$ represents the initialization value, $n_s$ represents a timeslot number, l represents an orthogonal frequency division multiplexing OFDM symbol number, $N_{beam}^{ID}$ represents the beam identifier, and $N_{CP}$ represents a cyclic prefix CP length identifier.

Optionally, the processor 1104 is further configured to invoke the program code, so as to perform the following operations:

generating a specified identifier according to the beam identifier and the cell identity; and calculating the initialization value according to the specified identifier by using the following formula:

$$c_{init} = 2^{10} \cdot (7 \cdot (n_s+1) + l + 1) \cdot (2 \cdot N_{ID}^{new} + 1) + 2 \cdot N_{ID}^{new} + N_{CP},$$
where $c_{init}$ represents the initialization value, $n_s$ represents a timeslot number, l represents an orthogonal frequency division multiplexing OFDM symbol number, $N_{ID}^{new}$ represents the specified identifier, and $N_{CP}$ represents a cyclic prefix CP length identifier.

Optionally, the processor 1104 is further configured to invoke the program code, so as to perform the following operation:

generating a beam signal corresponding to the beam identifier, where the beam signal includes the beam identifier.

Correspondingly, the processor 1104 is further configured to invoke the program code, so as to perform the following operations:

determining a time-frequency resource location of the beam signal; and sending the beam signal at the time-frequency resource location of the beam signal by using the beam corresponding to the beam identifier, so that user equipment detecting the beam signal obtains the beam identifier included in the beam signal.

Optionally, there is a preset spacing between the determined time-frequency resource location of the beam signal and a time-frequency resource location of a third signal.

Optionally, the processor 1104 is further configured to invoke the program code, so as to perform the following operations:

determining the time-frequency resource location of the beam signal as a preset time-frequency resource location; and sending the beam signal at the preset time-frequency resource location by using the beam corresponding to the beam identifier, so that the user equipment detects the beam signal at the preset time-frequency resource location, and obtains the beam identifier included in the beam signal.

Optionally, the processor 1104 is further configured to invoke the program code, so as to perform the following operation:

sending time-frequency resource information to the user equipment, where the time-frequency resource information includes a time-frequency resource location identifier of the beam signal, so that the user equipment detects the beam signal at the time-frequency resource location according to the time-frequency resource location identifier.

Optionally, the processor 1104 is further configured to invoke the program code, so as to perform the following operations:

determining, according to a preset correspondence between a time-frequency resource location identifier and a beam identifier, a time-frequency resource location identifier corresponding to the beam identifier; and configuring, to the signal, a time-frequency resource indicated by the time-frequency resource location identifier, so that when the signal is sent by using the beam corresponding to the beam identifier, the user equipment detecting the signal obtains the beam identifier according to the time-frequency resource location identifier of the signal and the correspondence.

Optionally, in the correspondence, a beam identifier corresponding to each time-frequency resource location identifier is obtained by performing modulo operation on the corresponding time-frequency resource location identifier and a total beam quantity.

Correspondingly, the time-frequency resource indicated by the time-frequency resource location identifier is configured to the signal, so that the user equipment detecting the signal performs modulo operation on the time-frequency resource location identifier of the signal and the total beam quantity, so as to obtain the beam identifier.

Optionally, the processor 1104 is further configured to invoke the program code, so as to perform the following operations:

if multiple beam identifiers fed back by the user equipment are received, obtaining signal strength corresponding to each beam identifier;

selecting one beam identifier from the multiple beam identifiers according to the signal strength corresponding to the multiple beam identifiers; and communicating with the user equipment by using a beam corresponding to the selected beam identifier.

All the optional technical solutions may be combined in any manner to form an optional embodiment of the present disclosure. Details are not further described herein one by one.

Figure 12:
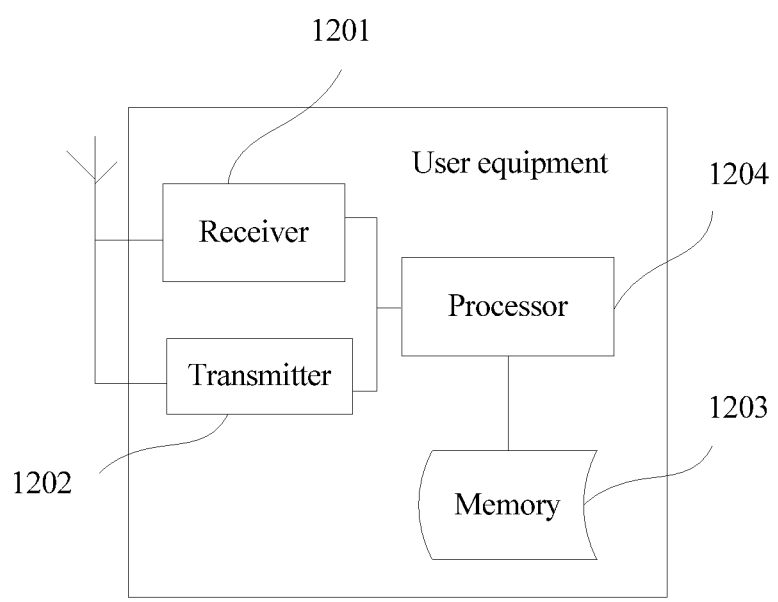
FIG. 12 is a schematic structural diagram of user equipment according to an embodiment of the present disclosure.

FIG. 12 is a schematic structural diagram of user equipment according to an embodiment of the present disclosure. Referring to FIG. 12, the user equipment includes a receiver 1201, a transmitter 1202, a memory 1203, and a processor 1204. Each of the receiver 1201, the transmitter 1202, and the memory 1203 is connected to the processor 1204. The memory 1203 stores program code. The processor 1204 is configured to invoke the program code, so as to perform the following operations:

detecting a signal sent by a base station by using a beam, where the signal is corresponding to a beam identifier of the beam;

obtaining the beam identifier according to the signal; and sending the beam identifier to the base station, so that the base station communicates with the user equipment by using the beam corresponding to the beam identifier.

Optionally, the processor 1204 is further configured to invoke the program code, so as to perform the following operations:

descrambling the signal to obtain a scrambling sequence of the signal, and obtaining the beam identifier according to the scrambling sequence, where the signal is obtained by the base station by performing scrambling according to the beam identifier; or parsing the signal to obtain an initialization value of the signal, and obtaining the beam identifier according to the initialization value, where the initialization value is calculated by the base station according to the beam identifier; or determining, according to a preset correspondence between a time-frequency resource location identifier and a beam identifier, a beam identifier corresponding to a time-frequency resource location identifier of the signal, where a time-frequency resource location of the signal is determined according to the beam identifier and the correspondence; or obtaining a time-frequency resource location identifier of the signal, and performing modulo operation on the time-frequency resource location identifier and a total beam quantity, so as to obtain the beam identifier.

Optionally, the processor 1204 is further configured to invoke the program code, so as to perform the following operation:

detecting a beam signal sent by the base station by using the beam, where the beam signal includes the beam identifier.

Optionally, the processor 1204 is further configured to invoke the program code, so as to perform the following operation:

detecting the beam signal at a location between which and a time-frequency resource location of a third signal there is a preset spacing, where there is the preset spacing between a time-frequency resource location of the beam signal and the time-frequency resource location of the third signal.

Optionally, the processor 1204 is further configured to invoke the program code, so as to perform the following operation:

detecting the beam signal at a preset time-frequency resource location.

Optionally, the processor 1204 is further configured to invoke the program code, so as to perform the following operations:

receiving time-frequency resource information sent by the base station, where the time-frequency resource information includes a time-frequency resource location identifier of the beam signal; and detecting the beam signal at the time-frequency resource location according to the time-frequency resource location identifier.

Optionally, the processor 1204 is further configured to invoke the program code, so as to perform the following operations:

when detecting multiple signals sent by the base station, obtaining signal strength of each signal in the multiple signals; and sending the signal strength of each signal and a corresponding beam identifier to the base station, so that the base station selects one beam identifier from multiple received beam identifiers according to signal strength corresponding to the multiple beam identifiers, and communicates with the user equipment by using a beam corresponding to the selected beam identifier; or successively sending, to the base station in descending order of the signal strength of all the signals, a beam identifier corresponding to each signal, so that the base station selects one beam identifier from the multiple beam identifiers according to a receiving order of all the beam identifiers, and communicates with the user equipment by using a beam corresponding to the selected beam identifier; or selecting one beam identifier according to signal strength of a signal corresponding to each beam identifier, and sending the selected beam identifier to the base station, so that the base station communicates with the user equipment by using a beam corresponding to the beam identifier.

All the optional technical solutions may be combined in any manner to form an optional embodiment of the present disclosure. Details are not further described herein one by one.

Figure 13:
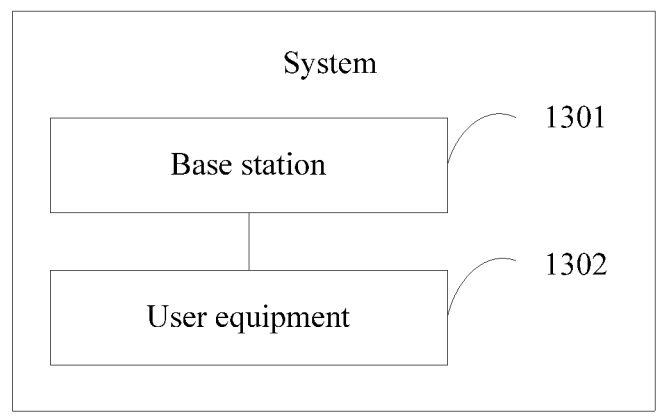
FIG. 13 is a schematic structural diagram of a system according to an embodiment of the present disclosure.

FIG. 13 is a schematic structural diagram of a system according to an embodiment of the present disclosure. Referring to FIG. 13, the system includes a base station 1301 and user equipment 1302.

The base station 1301 is configured to determine a signal corresponding to a beam identifier.

The base station 1301 is further configured to send the signal by using a beam corresponding to the beam identifier.

The user equipment 1302 is configured to: detect the signal sent by the base station 1301, and obtain the beam identifier according to the signal.

The user equipment 1302 is further configured to send the beam identifier to the base station 1301.

The base station 1301 is further configured to: when receiving the beam identifier fed back by the user equipment 1302, communicate with the user equipment 1302 by using the beam corresponding to the beam identifier.

Optionally, the base station 1301 is further configured to scramble a first signal according to the beam identifier, so as to obtain a second signal.

Optionally, when the first signal is a secondary synchronization signal, the base station 1301 is further configured to generate a scrambling sequence according to the beam identifier, or the base station 1301 is further configured to generate a scrambling sequence according to the beam identifier and a total beam quantity.

The base station 1301 is further configured to scramble the first signal according to the generated scrambling sequence, so as to obtain the second signal.

Optionally, the base station 1301 is further configured to generate the scrambling sequence according to the beam identifier by using the following formula:

$$b_0(n)=\tilde{b}((n+N_{beam}^{ID})\bmod 31), \text{ where}$$

$b_0(n)$ represents the scrambling sequence, $N_{beam}^{ID}$ represents the beam identifier, $\tilde{b}(i)=1-2x_1(i)$, $0 \le i \le 30$, $x_1(\bar{i}+5)=(a \cdot x_1(\bar{i}+4)+b \cdot x_1(\bar{i}+3)+c \cdot x_1(\bar{i}+2)+d \cdot x_1(\bar{i}+1)+e \cdot x_1(\bar{i}))\bmod 2$, $0 \le \bar{i} \le 25$, and a value of each of a, b, c, d, and e is 0 or 1.

Optionally, the base station 1301 is further configured to scramble the first signal according to the generated scrambling sequence by using the following formulas, so as to obtain the second signal:

$$d(2n) = \begin{cases} s_0^{(m_0)}(n)c_0(n)b_0(n) & \text{in a subframe m} \\ s_1^{(m_1)}(n)c_0(n)b_0(n) & \text{in a subframe n} \end{cases}$$

$$d(2n+1) = \begin{cases} s_1^{(m_1)}(n)c_1(n)b_0(n)z_1^{(m_0)}(n) & \text{in a subframe m} \\ s_0^{(m_0)}(n)c_1(n)b_0(n)z_1^{(m_1)}(n) & \text{in a subframe n} \end{cases},$$

where $b_0(n)$ represents the scrambling sequence, $0 \le n \le 30$, $d(2n)$ and $d(2n+1)$ represent sequences of the second signal, and the subframe m and the subframe n represent subframes in which the secondary synchronization signal is located;

$$s_0^{(m_0)}(n)=\tilde{s}((n+m_0)\bmod 31)$$

$$s_1^{(m_1)}(n)=\tilde{s}((n+m_1)\bmod 31),$$

$\tilde{s}(j)=1-2x_2(j)$, $x_2(\bar{j}+5)=(x_2(\bar{j}+2)+x_2(\bar{j}))\bmod 2$, $0 \le j \le 30$, $0 \le \bar{j} \le 25$, and $x_2(0)=0$, $x_2(1)=0$, $x_2(2)=0$, $x_2(3)=0$, and $x_2(4)=1$;

$$c_0(n)=\tilde{c}((n+N_{ID}^{(2)})\bmod 31)$$

$$c_1(n)=\tilde{c}((n+N_{ID}^{(2)}+3)\bmod 31),$$

$N_{ID}^{(2)}$ represents a cell identity, $N_{ID}^{(2)} \in \{0,1,2\}$, $\tilde{c}(k)=1-2x_3(k)$, $0 \le k \le 30$, $x_3(\bar{k}+5)=(x_3(\bar{k}+3)+x_3(\bar{k}))\bmod 2$, $0 \le \bar{k} \le 25$, and $x_3(0)=0$, $x_3(1)=0$, $x_3(2)=0$, $x_3(3)=0$, and $x_3(4)=1$; and $$z_0^{(m_0)}(n)=\tilde{z}((n+(m_0 \bmod 8))\bmod 31)$$

$$z_1^{(m_1)}(n)=\tilde{z}((n+(m_1 \bmod 8))\bmod 31),$$

$\tilde{z}(r)=1-2x_4(r)$, $0 \le r \le 30$, $x_4(\bar{r}+5)=(x_4(\bar{r}+4)+x_4(\bar{r}+2)+x_4(\bar{r}+1)+x_4(\bar{r}))\bmod 2$, $0 \le \bar{r} \le 25$, and $x_4(0)=0$, $x_4(1)=0$, $x_4(2)=0$, $x_4(3)=0$, and $x_4(4)=1$.

Optionally, the base station 1301 is further configured to generate scrambling sequences according to the beam identifier and the total beam quantity by using the following formulas:

$$b_0(n)=\tilde{b}((n+N_{beam}^{ID})\bmod 31)$$

$$b_1(n)=\tilde{b}((n+N_{beam}^{ID}+N_{sumbeam})\bmod 31), \text{ where}$$

$b_0(n)$ and $b_1(n)$ represent the scrambling sequences, $N_{beam}^{ID}$ represents the beam identifier, $N_{sumbeam}$ represents the total beam quantity, $N_{beam}^{ID}=0,1,\ldots,N_{sumbeam}-1$, $\tilde{b}(i)=1-2x_1(i)$, and $0 \le i \le 30$; and;

$x_1(\bar{i}+5)=(a \cdot x_1(\bar{i}+4)+b \cdot x_1(\bar{i}+3)+c \cdot x_1(\bar{i}+2)+d \cdot x_1(\bar{i}+1)+e \cdot x_1(\bar{i}))\bmod 2$, $0 \le \bar{i} \le 25$, and a value of each of a, b, c, d, and e is 0 or 1.

Optionally, the base station 1301 is further configured to scramble the first signal according to the generated scrambling sequence by using the following formulas, so as to obtain the second signal:

$$d(2n) = \begin{cases} s_0^{(m_0)}(n)c_0(n)b_0(n) & \text{in a subframe m} \\ s_1^{(m_1)}(n)c_0(n)b_0(n) & \text{in a subframe n} \end{cases}$$

$$d(2n+1) = \begin{cases} s_1^{(m_1)}(n)c_1(n)b_1(n)z_1^{(m_0)}(n) & \text{in a subframe m} \\ s_0^{(m_0)}(n)c_1(n)b_1(n)z_1^{(m_1)}(n) & \text{in a subframe n} \end{cases},$$

where $b_0(n)$ and $b_1(n)$ represent the scrambling sequences, $0 \le n \le 30$, $d(2n)$ and $d(2n+1)$ represent sequences of the second signal, and the subframe m and the subframe n represent subframes in which the secondary synchronization signal is located;

$$s_0^{(m_0)}(n)=\tilde{s}((n+m_0)\bmod 31)$$

$$s_1^{(m_1)}(n)=\tilde{s}((n+m_1)\bmod 31),$$

$\tilde{s}(j)=1-2x_2(j)$, $x_2(\bar{j}+5)=(x_2(\bar{j}+2)+x_2(\bar{j}))\bmod 2$, $0 \le j \le 30$, $0 \le \bar{j} \le 25$, and $x_2(0)=0$, $x_2(1)=0$, $x_2(2)=0$, $x_2(3)=0$, and $x_2(4)=1$;

$$c_0(n)=\tilde{c}((n+N_{ID}^{(2)})\bmod 31)$$

$$c_1(n)=\tilde{c}((n+N_{ID}^{(2)}+3)\bmod 31),$$

$N_{ID}^{(2)}$ represents a cell identity, $N_{ID}^{(2)} \in \{0,1,2\}$, $\tilde{c}(k)=1-2x_3(k)$, $0 \le k \le 30$, $x_3(\bar{k}+5)=(x_3(\bar{k}+3)+x_3(\bar{k}))\bmod 2$, $0 \le \bar{k} \le 25$, and $x_3(0)=0$, $x_3(1)=0$, $x_3(2)=0$, $x_3(3)=0$, and $x_3(4)=1$; and $$z_0^{(m_0)}(n)=\tilde{z}((n+(m_0 \bmod 8))\bmod 31)$$

$$z_1^{(m_1)}(n)=\tilde{z}((n+(m_1 \bmod 8))\bmod 31),$$

$\tilde{z}(r)=1-2x_4(r)$, $0 \le r \le 30$, $x_4(\bar{r}+5)=(x_4(\bar{r}+4)+x_4(\bar{r}+2)+x_4(\bar{r}+1)+x_4(\bar{r}))\bmod 2$, $0 \le \bar{r} \le 25$, and $x_4(0)=0$, $x_4(1)=0$, $x_4(2)=0$, $x_4(3)=0$, and $x_4(4)=1$.

Optionally, the base station 1301 is further configured to: calculate an initialization value according to the beam identifier, or calculate an initialization value according to the beam identifier and a cell identity; and generate a reference signal according to the calculated initialization value.

Optionally, the reference signal is a cell-specific reference signal CRS or a channel state information-reference signal CSI-RS.

Optionally, the base station 1301 is further configured to calculate the initialization value according to the beam identifier by using the following formula:

$$c_{init}=2^{10} \cdot (7 \cdot (n_s+1)+l+1) \cdot (2 \cdot N_{beam}^{ID}+1)+2 \cdot N_{beam}^{ID}+N_{CP}, \text{ where}$$

$c_{init}$ represents the initialization value, $n_s$ represents a timeslot number, l represents an orthogonal frequency division multiplexing OFDM symbol number, $N_{beam}^{ID}$ represents the beam identifier, and $N_{CP}$ represents a cyclic prefix CP length identifier.

Optionally, the base station 1301 is further configured to generate a specified identifier according to the beam identifier and the cell identity.

The base station 1301 is further configured to calculate the initialization value according to the specified identifier by using the following formula:

$$c_{init}=2^{10} \cdot (7 \cdot (n_s+1)+l+1) \cdot (2 \cdot N_{ID}^{new}+1)+2 \cdot N_{ID}^{new}+N_{CP},$$
where $c_{init}$ represents the initialization value, $n_s$ represents a timeslot number, l represents an orthogonal frequency division multiplexing OFDM symbol number, $N_{ID}^{new}$ represents the specified identifier, and $N_{CP}$ represents a cyclic prefix CP length identifier.

Optionally, the base station 1301 is further configured to generate a beam signal corresponding to the beam identifier, where the beam signal includes the beam identifier.

Correspondingly, the method further includes:

the base station 1301 is further configured to determine a time-frequency resource location of the beam signal.

The base station 1301 is further configured to send the beam signal at the time-frequency resource location of the beam signal by using the beam corresponding to the beam identifier, so that user equipment detecting the beam signal obtains the beam identifier included in the beam signal.

Optionally, there is a preset spacing between a time-frequency resource location of a third signal and the time-frequency resource location that is of the beam signal and that is determined by the base station 1301.

Optionally, the base station 1301 is further configured to determine the time-frequency resource location of the beam signal as a preset time-frequency resource location.

The base station 1301 is further configured to send the beam signal at the preset time-frequency resource location by using the beam corresponding to the beam identifier, so that the user equipment detects the beam signal at the preset time-frequency resource location, and obtains the beam identifier included in the beam signal.

Optionally, the base station 1301 is further configured to send time-frequency resource information to the user equipment, where the time-frequency resource information includes a time-frequency resource location identifier of the beam signal, so that the user equipment detects the beam signal at the time-frequency resource location according to the time-frequency resource location identifier.

Optionally, the base station 1301 is further configured to determine, according to a preset correspondence between a time-frequency resource location identifier and a beam identifier, a time-frequency resource location identifier corresponding to the beam identifier.

The base station 1301 is further configured to configure, to the signal, a time-frequency resource indicated by the time-frequency resource location identifier, so that when the signal is sent by using the beam corresponding to the beam identifier, the user equipment detecting the signal obtains the beam identifier according to the time-frequency resource location identifier of the signal and the correspondence.

Optionally, in the correspondence, a beam identifier corresponding to each time-frequency resource location identifier is obtained by performing modulo operation on the corresponding time-frequency resource location identifier and a total beam quantity.

Correspondingly, the base station 1301 configures, to the signal, the time-frequency resource indicated by the time-frequency resource location identifier, so that the user equipment detecting the signal performs modulo operation on the time-frequency resource location identifier of the signal and the total beam quantity, so as to obtain the beam identifier.

Optionally, the base station 1301 is further configured to: if the base station 1301 receives multiple beam identifiers fed back by the user equipment, obtain signal strength corresponding to each beam identifier.

The base station 1301 is further configured to select one beam identifier from the multiple beam identifiers according to the signal strength corresponding to the multiple beam identifiers.

The base station 1301 is further configured to communicate with the user equipment by using a beam corresponding to the selected beam identifier.

Optionally, the user equipment 1302 is further configured to: descramble the signal to obtain a scrambling sequence of the signal, and obtain the beam identifier according to the scrambling sequence, where the signal is obtained by the base station by performing scrambling according to the beam identifier; or parse the signal to obtain an initialization value of the signal, and obtain the beam identifier according to the initialization value, where the initialization value is calculated by the base station according to the beam identifier; or determine, according to a preset correspondence between a time-frequency resource location identifier and a beam identifier, a beam identifier corresponding to a time-frequency resource location identifier of the signal, where a time-frequency resource location of the signal is determined according to the beam identifier and the correspondence; or obtain a time-frequency resource location identifier of the signal, and perform modulo operation on the time-frequency resource location identifier and a total beam quantity to obtain the beam identifier.

Optionally, the user equipment 1302 is further configured to detect a beam signal sent by the base station by using the beam, where the beam signal includes the beam identifier.

Optionally, the user equipment 1302 is further configured to detect the beam signal at a location between which and a time-frequency resource location of a third signal there is a preset spacing, where there is the preset spacing between a time-frequency resource location of the beam signal and the time-frequency resource location of the third signal.

Optionally, the user equipment 1302 is further configured to detect the beam signal at a preset time-frequency resource location.

Optionally, the user equipment 1302 is further configured to: receive time-frequency resource information sent by the base station, where the time-frequency resource information includes a time-frequency resource location identifier of the beam signal; and detect the beam signal at the time-frequency resource location according to the time-frequency resource location identifier.

Optionally, the user equipment 1302 is further configured to: when detecting multiple signals sent by the base station, obtain signal strength of each signal in the multiple signals; and send the signal strength of each signal and a corresponding beam identifier to the base station, so that the base station selects one beam identifier from multiple received beam identifiers according to signal strength corresponding to the multiple beam identifiers, and communicates with the user equipment 1302 by using a beam corresponding to the selected beam identifier; or successively send, to the base station in descending order of the signal strength of all the signals, a beam identifier corresponding to each signal, so that the base station selects one beam identifier from the multiple beam identifiers according to a receiving order of all the beam identifiers, and communicates with the user equipment 1302 by using a beam corresponding to the selected beam identifier; or select one beam identifier according to signal strength of a signal corresponding to each beam identifier, and send the selected beam identifier to the base station, so that the base station communicates with the user equipment 1302 by using a beam corresponding to the beam identifier.

All the optional technical solutions may be combined in any manner to form an optional embodiment of the present disclosure. Details are not further described herein one by one.

Persons of ordinary skill in the art may understand that all or some of the steps of the embodiments maybe implemented by hardware or a program instructing related hardware. The program may be stored in a computer-readable storage medium. The mentioned storage medium may be a read-only memory, a magnetic disk, an optical disc, or the like.

The descriptions are only examples of the embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A communication method, comprising:
    obtaining a beam index by performing modulo operation on a time-frequency location identifier and a total beam quantity, wherein the time-frequency location identifier indicates a time-frequency resource location;
    calculating an initialization value according to the beam index and a cell identity;
    generating, according to the initialization value, a reference signal; and
    sending the reference signal on the time-frequency resource location using a beam corresponding to the beam index.

2. The communication method of claim 1, wherein calculating the initialization value comprises:
    generating a specified identifier according to the beam index and the cell identity, wherein the specified identifier corresponds to both the beam index and the cell identity; and
    calculating the initialization value according to the specified identifier using the following formula:

$c_{init}=2^{10} \cdot (7 \cdot (n_s+1)+l+1) \cdot (2 \cdot N_{ID}^{new}+1)+2 \cdot N_{ID}^{new}+N_{CP}$, wherein $c_{init}$ represents the initialization value, wherein $n_s$ represents a timeslot number, wherein l represents an orthogonal frequency division multiplexing (OFDM) symbol number, wherein $N_{ID}^{new}$ represents the specified identifier, and wherein $N_{CP}$ represents a cyclic prefix (CP) length identifier.

3. The communication method of claim 1, further comprising receiving the beam index from a user equipment.

4. The communication method of claim 3, further comprising communicating with the user equipment using the beam corresponding to the beam index.

5. The communication method of claim 4, wherein communicating with the user equipment using the beam corresponding to the beam index comprises:
    receiving multiple beam indices from the user equipment;
    obtaining signal strength corresponding to each beam index;
    selecting one beam index from the multiple beam indices according to the signal strength corresponding to each beam index; and
    communicating with the user equipment using a beam corresponding to the one beam index.

6. The communication method of claim 1, wherein calculating the initialization value comprises calculating the initialization value using the following formula:

$c_{init}=2^{10} \cdot (7 \cdot (n_s+1)+l+1) \cdot (2 \cdot N_{beam}^{ID}+1)+2 \cdot N_{beam}^{ID}+N_{CP}$, wherein $C_{init}$ represents the initialization value, wherein $n_s$ represents a timeslot number, wherein l represents an orthogonal frequency division multiplexing (OFDM) symbol number, wherein $N_{beam}^{ID}$ represents a beam identifier identifying the beam, and wherein $N_{CP}$ represents a cyclic prefix (CP) length identifier.

7. The communication method of claim 1, further comprising sending time-frequency resource information to a user equipment, wherein the time-frequency resource information includes a time-frequency resource location identifier of the reference signal.

8. A communication apparatus, comprising:
    a processor; and
    a memory coupled to the processor and storing a non-transitory program code that, when executed by the processor, causes the communication apparatus to:
        detect a signal on a time-frequency resource location indicated by a time-frequency location identifier, wherein the signal is carried by a beam, and wherein the signal corresponds to a beam index of the beam and a cell identity;
        obtain the beam index by performing modulo operation on the time-frequency location identifier and a total beam quantity; and
        communicate with a base station on a cell corresponding to the cell identity using the beam corresponding to the beam index.

9. The communication apparatus of claim 8, wherein the non-transitory program code, when executed by the processor, further causes the communication apparatus to:
    detect multiple signals;
    obtain signal strength of each signal of the multiple signals; and
    send the signal strength of each signal and a corresponding beam index.

10. The communication apparatus of claim 8, wherein the non-transitory program code, when executed by the processor, further causes the communication apparatus to send the beam index to the base station.

11. The communication apparatus according to claim 8, wherein the non-transitory program code, when executed by the processor, further causes the communication apparatus to:
    detect multiple signals;
    obtain signal strength of each signal of the multiple signals; and
    successively send, in descending order of the signal strength of all the signals, a beam index corresponding to each signal.

12. The communication apparatus according to claim 8, wherein the non-transitory program code, when executed by the processor, further causes the communication apparatus to:
    detect multiple signals;
    obtain signal strength of each signal of the multiple signals;
    select one beam index according to signal strength of a signal corresponding to each beam index; and
    send the one beam index.

13. The communication apparatus of claim 8, wherein the communication apparatus comprises a user equipment.

14. A communication apparatus, comprising:
    a processor; and
    a memory coupled to the processor and storing non-transitory program code that, when executed by the processor, causes the communication apparatus to:
        obtain a beam index by performing modulo operation on a time-frequency location identifier and a total beam quantity, wherein the time-frequency location identifier indicates a time-frequency resource location;
        calculate an initialization value according to the beam index and a cell identity;

generate, according to the initialization value, a reference signal; and send the reference signal on the time-frequency resource location using a beam corresponding to the beam index.

15. The communication apparatus of claim 14, wherein to calculate the initialization value according to the beam index and the cell identity, the non-transitory program code, when executed by the processor, causes the communication apparatus to:

generate a specified identifier according to the beam index and the cell identity, wherein the specified identifier corresponds to both the beam index and the cell identity; and calculate the initialization value according to the specified identifier using the following formula:

$$c_{init}=2^{10}\cdot(7\cdot(n_s+1)+l+1)\cdot(2\cdot N_{ID}^{new}+1)+2\cdot N_{ID}^{new}+N_{CP},$$

wherein $c_{init}$ represents the initialization value, wherein $n_s$ represents a timeslot number, wherein l represents an orthogonal frequency division multiplexing (OFDM) symbol number, wherein $N_{ID}^{new}$ represents the specified identifier, and wherein $N_{CP}$ represents a cyclic prefix (CP) length identifier.

16. The communication apparatus of claim 14, wherein the non-transitory program code, when executed by the processor, further causes the communication apparatus to receive the beam index from a user equipment.

17. The communication apparatus of claim 16, wherein the non-transitory program code, when executed by the processor, further causes the communication apparatus to communicate with the user equipment using the beam corresponding to the beam index.

18. The communication apparatus of claim 17, wherein to communicate with the user equipment using the beam corresponding to the beam index, the non-transitory program code, when executed by the processor, causes the communication apparatus to:

receive multiple beam indices from the user equipment;

obtain signal strength corresponding to each beam index;

select one beam index from the multiple beam indices according to the signal strength corresponding to each beam index; and communicate with the user equipment using a beam corresponding to the one beam index.

19. The communication apparatus of claim 14, wherein to calculate the initialization value according to the beam index and the cell identity, the non-transitory program code, when executed by the processor, causes the communication apparatus to calculate the initialization value using the following formula:

$$c_{init}=2^{10}\cdot(7\cdot(n_s+1)+l+1)\cdot(2\cdot N_{beam}^{ID}+1)+2\cdot N_{beam}^{ID}+N_{CP},$$

wherein $C_{init}$ represents the initialization value, wherein $n_s$ represents a timeslot number, wherein l represents an orthogonal frequency division multiplexing (OFDM) symbol number, wherein $N_{beam}^{ID}$ represents a beam identifier identifying the beam, and wherein $N_{CP}$ represents a cyclic prefix (CP) length identifier.

20. The communication apparatus of claim 14, wherein the non-transitory program code further causes the communication apparatus to send time-frequency resource information to a user equipment, and wherein the time-frequency resource information includes a time-frequency resource location identifier of the reference signal.

* * * * *